United States Patent
Ishii

(10) Patent No.: US 12,167,490 B2
(45) Date of Patent: Dec. 10, 2024

(54) SYSTEMS, DEVICES, AND METHODS FOR HANDLING RADIO LINK FAILURES IN WIRELESS RELAY NETWORKS

(71) Applicant: SHARP KABUSHIKI KAISHA, Sakai (JP)

(72) Inventor: Atsushi Ishii, Vancouver, WA (US)

(73) Assignee: SHARP KABUSHIKI KAISHA, Sakai (JP)

(*) Notice: Subject to any disclaimer, the term of this patent is extended or adjusted under 35 U.S.C. 154(b) by 436 days.

(21) Appl. No.: 17/277,049

(22) PCT Filed: Sep. 12, 2019

(86) PCT No.: PCT/JP2019/035932
§ 371 (c)(1),
(2) Date: Mar. 17, 2021

(87) PCT Pub. No.: WO2020/059633
PCT Pub. Date: Mar. 26, 2020

(65) Prior Publication Data
US 2022/0039188 A1  Feb. 3, 2022

Related U.S. Application Data

(60) Provisional application No. 62/734,221, filed on Sep. 20, 2018.

(51) Int. Cl.
*H04W 76/19* (2018.01)
*H04W 24/04* (2009.01)
(Continued)

(52) U.S. Cl.
CPC ........... *H04W 76/19* (2018.02); *H04W 24/04* (2013.01); *H04W 84/047* (2013.01); *H04W 88/08* (2013.01)

(58) Field of Classification Search
CPC ...... H04W 24/04; H04W 76/19; H04W 88/08
See application file for complete search history.

(56) References Cited

U.S. PATENT DOCUMENTS

| 12,058,768 B2* | 8/2024 | Kim ..................... H04W 76/30 |
| 2012/0006329 A1 | 1/2012 | Beevers et al. |

(Continued)

FOREIGN PATENT DOCUMENTS

| BY | 15138 C1 | 12/2011 |
| CN | 102223658 A | 10/2011 |

(Continued)

OTHER PUBLICATIONS

Vivo, IAB Topology and Routing Management [online], 3GPP TSG RAN WG2 #103 R2-1811778, Aug. 24, 2018.
Alcatel-Lucent, "Radio link failure and recovery", R2-102287, 3GPP TSG-RAN WG2 Meeting #69bis, Apr. 12-16, 2010, Beijing, China, p. 1-p. 2.
ETSI, "ETSI TS 133 501 V16.3.0", Aug. 1, 2018, p. 232.

(Continued)

*Primary Examiner* — Syed Ali
(74) *Attorney, Agent, or Firm* — ScienBiziP, P.C.

(57) ABSTRACT

An integrated access and backhaul (IAB) node equipped with at least two radio interfaces comprising a first interface and a second interface, the first interface being configured to establish a first radio link with at least one parent node, the second interface being configured to establish a second radio link(s) with one or more wireless terminals, the IAB node comprising:
processor circuitry configured to: detect a radio link failure (RLF) on the first radio link for the first interface, and; perform a re-establishment procedure on the first radio link for the first interface to re-establish a radio resource control (RRC) connection with at least one parent node; transmitter circuitry configured to transmit, on the second radio link for the second interface, an RLF notification to the one or more wireless terminals; wherein; the RLF notification indicates that the re-establishment procedure has failed.

8 Claims, 20 Drawing Sheets

(51) Int. Cl.
*H04W 84/04* (2009.01)
*H04W 88/08* (2009.01)

(56) References Cited

U.S. PATENT DOCUMENTS

| | | | |
|---|---|---|---|
| 2015/0071227 A1 | 3/2015 | Yi et al. | |
| 2016/0249235 A1 | 8/2016 | Li et al. | |
| 2021/0235332 A1* | 7/2021 | Schmidt | H04W 36/04 |
| 2021/0258109 A1* | 8/2021 | Cho | H04L 1/1642 |
| 2021/0314917 A1* | 10/2021 | Lee | H04W 72/02 |
| 2021/0321277 A1* | 10/2021 | Murray | H04W 72/23 |
| 2021/0352522 A1* | 11/2021 | Hwang | H04W 28/0278 |
| 2022/0201767 A1* | 6/2022 | Wei | H04W 74/0866 |
| 2024/0260090 A1* | 8/2024 | Jeon | H04W 74/0833 |
| 2024/0260091 A1* | 8/2024 | Zhou | H04B 17/309 |

FOREIGN PATENT DOCUMENTS

| | | | | |
|---|---|---|---|---|
| CN | 102484807 A | 5/2012 | | |
| CN | 104902569 A | 9/2015 | | |
| EA | 5826 B1 | 6/2005 | | |
| EP | 2555553 A | 2/2013 | | |
| EP | 2555553 A2 * | 2/2013 | | H04B 7/155 |
| EP | 3100396 A1 | 12/2016 | | |
| JP | 2012-533210 A | 12/2012 | | |
| KR | 10-2013-0021352 A | 3/2013 | | |
| WO | 2011/122894 A | 10/2011 | | |
| WO | 2015116877 A1 | 8/2015 | | |
| WO | 2017/213895 A1 | 12/2017 | | |

OTHER PUBLICATIONS

ZTE, "Discussion on IAB topology adaptation", R3-183688, 3GPP TSG-RAN WG2 NR AdHoc 1807, Montreal, Canada, Jul. 2-6, 2018, figures 1, 2.

Qualcomm Incorporated, "Logging RLF caused vol. TE call drop", R2-156590, 3GPP TSG-RAN WG2 Meeting#92, Anaheim, USA, Nov. 16-20, 2015, p. 1.

3rd Generation Partnership Project; Technical Specification Group Radio Access Network; NR; NR and NG-RAN Overall Description; Stage 2 (Release 15), 3GPP TS 38.300 V15.3.0 (Sep. 2018).

3rd Generation Partnership Project; Technical Specification Group Radio Access Network; Study on Scenarios and Requirements for Next Generation Access Technologies; (Release 15), 3GPP TR 38.913 V15.0.0 (Jun. 2018).

3rd Generation Partnership Project; Technical Specification Group Radio Access Network; Study on new radio access technology: Radio access architecture and interfaces (Release 14), 3GPP TR 38.801 V14.0.0 (Mar. 2017).

3rd Generation Partnership Project; Technical Specification Group Radio Access Network; NG-RAN; Architecture description (Release 15), 3GPP TS 38.401 V15.3.0 (Sep. 2018).

Ericsson, "New WID on Support for Virtualized RAN in NR", 3GPP TSG RAN Meeting #81, RP-181932, Gold Coast, Australia, Sep. 10-13, 2018.

Huawei et al., "Harmonization of RRC Connection Control management procedures", R2-1803242, 3GPP TSG-RAN WG2#101, Athens, Greece, Feb. 26-Mar. 2, 2018 (Feb. 15, 2018).

* cited by examiner

SYSTEMS, DEVICES, AND METHODS FOR HANDLING RADIO LINK FAILURES IN WIRELESS RELAY NETWORKS

CROSS REFERENCE

This Nonprovisional application claims priority under 35 U.S.C. § 119 on provisional Application No. 62/734,221 on Sep. 20, 2018, the entire contents of which are hereby incorporated by reference.

TECHNICAL FIELD

The present embodiments relate to Integrated Access and Backhaul and backhauling for New Radio (NR) networks having Next generation NodeB capabilities and signaling. In particular, the present embodiments relate to a backhaul infrastructure and design for User Equipment and relay networks to handle Radio Link Failures.

BACKGROUND ART

In typical cellular mobile communication systems and networks, such as Long-Term Evolution (LTE) and New Radio (NR), a service area is covered by one or more base stations, where each of such base stations may be connected to a core network by fixed-line backhaul links (e.g., optical fiber cables). In some instances, due to weak signals from the base station at the edge of the service area, users tend to experience performance issues, such as: reduced data rates, high probability of link failures, etc. A relay node concept has been introduced to expand the coverage area and increase the signal quality. As implemented, the relay node may be connected to the base station using a wireless backhaul link.

In $3^{rd}$ Generation Partnership Project (3GPP), the relay node concept for the fifth generation (5G) cellular system has been discussed and standardized, where the relay nodes may utilize the same 5G radio access technologies (New Radio (NR)) for the operation of services to User Equipment (UE) (access link) and connections to the core network (backhaul link) simultaneously. These radio links may be multiplexed in time, frequency, and/or space. This system may be referred to as Integrated Access and Backhaul (IAB).

Some such cellular mobile communication systems and networks may comprise IAB-donors and IAB-nodes, where an IAB-donor may provide interface to a core network to UEs and wireless backhauling functionality to IAB-nodes; and additionally, an IAB-node may provide IAB functionality combined with wireless self-backhauling capabilities. IAB-nodes may need to periodically perform inter-IAB-node discovery to detect new IAB-nodes in their vicinity based on cell-specific reference signals (e.g., Synchronization Signal and PBCH block SSB). The cell-specific reference signals may be broadcasted on a Physical Broadcast Channel (PBCH) where packets may be carried or broadcasted on the Master Information Block (MIB) section.

Demand for wireless traffic has increased significantly over time and IAB systems are expected to be reliable and robust against various kinds of possible failures. Considerations have been given for IAB backhaul design. In particular, to provide methods and procedures to address radio link failures on the backhaul link.

SUMMARY OF INVENTION

In one example, a wireless node equipped with at least two radio interfaces comprising a first interface and a second interface, the first interface being configured to establish a first radio link with at least one parent node, the second interface being configured to establish a second radio link(s) with one or more wireless terminals, the wireless node comprising: receiver circuitry configured to receive, for the first interface, downlink (DL) user data and/or DL signaling data; transmitter circuitry configured to transmit, for the first interface, uplink (UL) user data and/or UL signaling data; receiver circuitry configured to receive, for the second interface, UL user data and/or UL signaling data; transmitter circuitry configured to transmit, for the second interface, DL user data and/or DL signaling data; processor circuitry configured to: relay the DL user data and/or DL signaling data from the first interface to the second interface; relay the UL user data and/or UL signaling data from the second interface to the first interface; monitor a radio condition on the first radio link for the first interface; wherein; radio link information representing the radio condition on the first radio link is transmitted on the second radio link for the second interface.

In one example, a wireless terminal equipped with at least one radio interface configured to establish a radio link with at least one wireless node, the wireless terminal comprising: receiver circuitry configured to receive, for the radio interface, downlink (DL) user data and/or DL signaling data; transmitter circuitry configured to transmit, for the radio interface, uplink (UL) user data and/or UL signaling data; processor circuitry configured to: perform a designated action based on a reception of radio link information; wherein; the radio link information represents the radio condition on a first radio link, and; the first radio link corresponds to a radio link between the wireless node and a parent node.

In one example, a method for a wireless node equipped with at least two radio interfaces comprising a first interface and a second interface, the first interface being configured to establish a first radio link with at least one parent node, the second interface being configured to establish a second radio link(s) with one or more wireless terminals, the method comprising: receiving, for the first interface, downlink (DL) user data and/or DL signaling data; transmitting, for the first interface, uplink (UL) user data and/or UL signaling data; receiving, for the second interface, UL user data and/or UL signaling data; transmitting, for the second interface, DL user data and/or DL signaling data; relaying the DL user data and/or DL signaling data from the first interface to the second interface; relaying the UL user data and/or UL signaling data from the second interface to the first interface; monitoring a radio condition on the first radio link for the first interface; wherein; radio link information representing the radio condition on the first radio link is transmitted on the second radio link for the second interface.

In one example, a method for a wireless terminal equipped with at least one radio interface configured to establish a radio link with at least one wireless node, the method comprising: receiving, for the radio interface, downlink (DL) user data and/or DL signaling data; transmitting, for the radio interface, uplink (UL) user data and/or UL signaling data; processor circuitry configured to: performing a designated action based on a reception of radio link information; wherein; the radio link information represents the radio condition on a first radio link, and; the first radio link corresponds to a radio link between the wireless node and a parent node.

In one example, a method of Handling Radio Link Failures (RLF) in a Wireless Relay Network, the wireless relay network having a donor node, a first parent node, a second parent node, a first child node, and a second child node, wherein the donor node is an Integrated Access and Backhaul (IAB) node connected to a core network, and wherein the first parent node, the second parent node, the first child node, and the second child node each have Mobile Termination (MT) functionality capabilities, the method comprising: transmitting, by a first child node (IAB-node A), a message comprising an Upstream RLF notification to a second child node (UE/IAB Child node) based on an upstream radio link failure between the first child node and a first parent node (IAB Parent node 1), wherein the first child node is in connected mode with the second child node; receiving, by the second child node in communication with the first child node, the message comprising the Upstream RLF notification, wherein the second child node is at least one of: a User Equipment (UE) and an Integrated Access and Backhaul (IAB) node; initiating, by the second child node, a cell selection procedure with a second parent node (IAB Parent node 2) before the expiration of a timer (Txxx) set for a period of time and based on the received Upstream RLF notification message from the first child node, wherein the initiating of the cell selection uses the MT functionality; listening, by the second child node, for incoming message from the first child node during a timer (Tyyy) set for another period of time before the initiating step; and performing, by the second child node, a reestablishment procedure with the first child node if an Upstream Recovery notification is received from the first parent node before the expiration of the timer (Tyyy).

BRIEF DESCRIPTION OF DRAWINGS

The various embodiments of the present embodiments now will be discussed in detail with an emphasis on highlighting the advantageous features. These embodiments depict the novel and non-obvious aspects of the invention shown in the accompanying drawings, which are for illustrative purposes only. These drawings include the following figures, in which like numerals indicate like parts.

DESCRIPTION OF EMBODIMENTS

Figure 1:
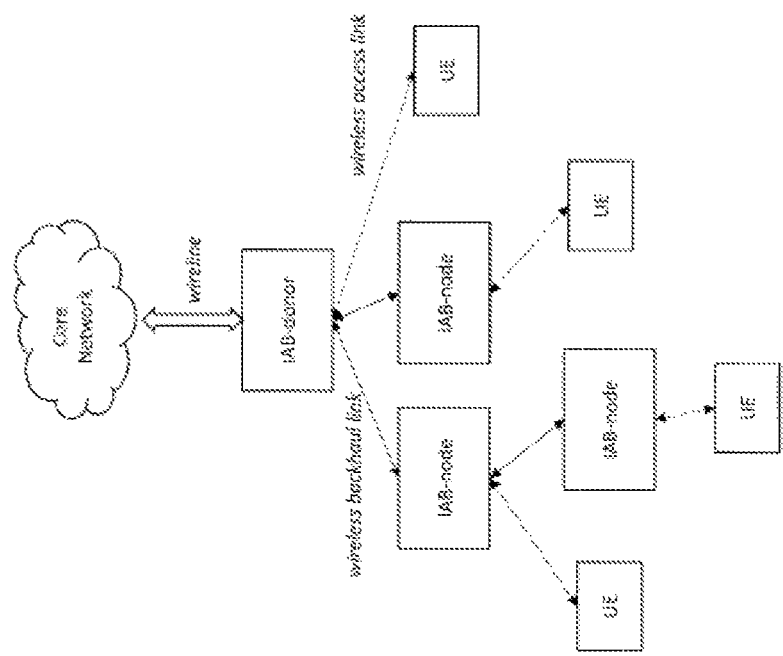
FIG. 1 illustrates a mobile network infrastructure using 5G signals and 5G base stations.

The various embodiments of the present Systems, Devices, and Methods for Handling Radio Link Failures in Wireless Relay Networks have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

Embodiments disclosed provide methods and systems for handling a scenario where an Integrated Access and Backhaul (IAB) node, for example, an IAB-parent node and/or an IAB-child node, loses the connection to the network due to a radio link failure. The disclosed embodiments provide a method for the IAB nodes (e.g., IAB-parent) to transmit information representing radio conditions of the upstream link to the child nodes and/or UEs of the IAB-node. The child nodes and/or UEs may, based on the received information representing radio conditions, determine whether or not to stay on the current serving IAB-node or select another cell/IAB-node. That is, via the information received from the IAB-nodes the child nodes and/or UEs may wait for a designated duration before determining whether to stay on the current serving IAB-node or attempt to select another cell/IAB-node to reestablish a connection with. In this embodiment, the child nodes and/or UEs may be expecting that the serving IAB-node may recover the upstream radio link during the waiting duration. In some embodiments, the information representing the radio condition of the upstream link of the IAB-node may be based on signal strength, for example, Reference Signal Received Power (RSRP)/Reference Signal Received Quality (RSRQ) levels, and an associated threshold, which a UE may use to determine whether to camp on the cell (IAB-donor or IAB-node).

The various embodiments of the present Systems, Devices, and Methods for Handling Radio Link Failures in Wireless Relay Networks now will be discussed in detail with an emphasis on highlighting the advantageous features. Additionally, the following detailed description describes the present embodiments with reference to the drawings.

A mobile network used in wireless networks may be where the source and destination are interconnected by way of a plurality of nodes. In such a network, the source and destination may not be able to communicate with each other directly due to the distance between the source and destination being greater than the transmission range of the nodes. That is, a need exists for intermediate node(s) to relay communications and provide transmission of information. Accordingly, intermediate node(s) may be used to relay information signals in a relay network, having a network topology where the source and destination are interconnected by means of such intermediate nodes. In a hierarchical telecommunications network, the backhaul portion of the network may comprise the intermediate links between the core network and the small subnetworks of the entire hierarchical network. Integrated Access and Backhaul (IAB) Next generation NodeB use 5G New Radio communications such as transmitting and receiving NR User Plane (U-Plane) data traffic and NR Control Plane (C-Plane) data. Both, the UE and gNB may include addressable memory in electronic communication with a processor. In one embodiment, instructions may be stored in the memory and are executable to process received packets and/or transmit packets according to different protocols, for example, Medium Access Control (MAC) Protocol and/or Radio Link Control (RLC) Protocol.

In some aspects of the embodiments for handling of radio link failures in wireless relay networks, disclosed is a Mobile Termination (MT) functionality-typically provided by the User Equipment (UE) terminals—that may be implemented by Base Transceiver Stations (BTSs or BSs) nodes, for example, IAB nodes. In one embodiment, the MT functions may comprise common functions such as: radio transmission and reception, encoding and decoding, error detection and correction, signaling, and access to a SIM.

In a mobile network, an IAB child node may use the same initial access procedure (discovery) as an access UE to establish a connection with an IAB node/donor or parent-thereby attaching to the network or camping on a cell. In one embodiment, Radio Resource Control (RRC) protocol may be used for signaling between 5G radio network and UE, where RRC may have at least two states (e.g., RRC_IDLE and RRC_CONNECTED) and state transitions. The RRC sublayer may enable establishing of connections based on the broadcasted system information and may also include a security procedure. The U-Plane may comprise of PHY, MAC, RLC and PDCP layers.

Embodiments of the present system disclose methods and devices for an IAB-node to inform child nodes and/or UEs of upstream radio conditions and accordingly, the term IAB-node may be used to represent either a parent IAB-node or a child IAB-node, depending on where the IAB-node is in the network communication with the IAB-donor which is responsible for the physical connection with the core network. Embodiments are disclosed where an IAB-node (child IAB-node) may follow the same initial access procedure as a UE, including cell search, system information acquisition, and random access, in order to initially set up a connection to a parent IAB-node or an IAB-donor. That is, when an IAB base station (eNB/gNB) needs to establish a backhaul connection to, or camp on, a parent IAB-node or an IAB-donor, the IAB-node may perform the same procedures and steps as a UE, where the IAB-node may be treated as a UE but distinguished from a UE by the parent IAB-node or the IAB-donor.

In the disclosed embodiments for handling radio link failures in wireless relay networks, MT functionality-typically offered by a UE—may be implemented on an IAB-node. In some examples of the disclosed systems, methods, and device embodiments, consideration may be made in order for a child IAB-node to monitor a radio condition on a radio link to a parent IAB-node—where the parent IAB-node may itself be a child IAB-node in communication with an IAB-donor.

With reference to FIG. 1, the present embodiments include a mobile network infrastructure using 5G signals and 5G base stations (or cell stations). Depicted is a system diagram of a radio access network utilizing IAB nodes, where the radio access network may comprise, for example, one IAB-donor and multiple IAB-nodes. Different embodiments may comprise different number of IAB-donor and IAB-node ratios. Herein, the IAB nodes may be referred to as IAB relay nodes. The IAB-node may be a Radio Access Network (RAN) node that supports wireless access to UEs and wirelessly backhauls the access traffic. The IAB-donor is a RAN node which may provide an interface to the core network to UEs and wireless backhauling functionality to IAB nodes. An IAB-node/donor may serve one or more IAB nodes using wireless backhaul links as well as UEs using wireless access links simultaneously. Accordingly, network backhaul traffic conditions may be implemented based on the wireless communication system to a plurality of IAB nodes and UEs.

With further reference to FIG. 1, a number of UEs are depicted as in communication with IAB nodes, for example, IAB nodes and IAB donor node, via wireless access link. Additionally, the IAB-nodes (child nodes) may be in communication with other IAB-nodes and/or an IAB-donor (all of which may be considered IAB parent nodes) via wireless backhaul link. For example, a UE may be connected to an IAB-node which itself may be connected to a parent IAB-node in communication with an IAB-donor, thereby extending the backhaul resources to allow for the transmission of backhaul traffic within the network and between parent and child for integrated access. The embodiments of the system provide for capabilities needed to use the broadcast channel for carrying information bit(s) (on the physical channels) and provide access to the core network.

Figure 2:
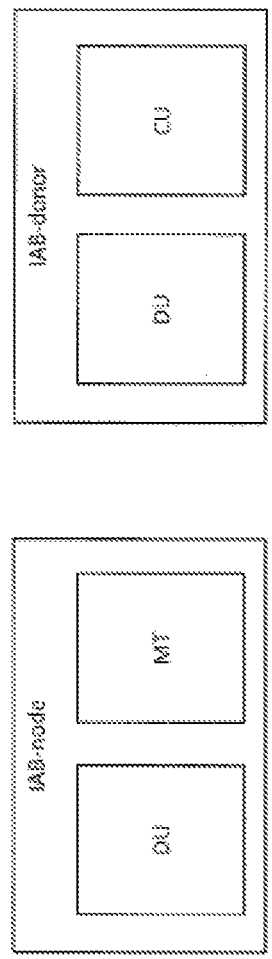
FIG. 2 depicts an example of functional block diagrams for the IAB-donor and the IAB-node.

FIG. 2 depicts an example of functional block diagrams for the IAB-donor and the IAB-node (see FIG. 1). The IAB-donor may comprise at least one Central Unit (CU) and at least one Distributed Unit (DU). The CU is a logical entity managing the DU collocated in the IAB-donor as well as the remote DUs resident in the IAB-nodes. The CU may also be an interface to the core network, behaving as a RAN base station (e.g., eNB or gNB). In some embodiments, the DU is a logical entity hosting a radio interface (backhaul/access) for other child IAB-nodes and/or UEs. In one configuration, under the control of CU, the DU may offer a physical layer and Layer-2 (L2) protocols (e.g., Medium Access Control (MAC), Radio Link Control (RLC), etc.) while the CU may manage upper layer protocols (such as Packet Data Convergence Protocol (PDCP), Radio Resource Control (RRC), etc.). An IAB-node may comprise DU and Mobile-Termination (MT) functions, where in some embodiments the DU may have the same functionality as the DU in the IAB-donor, whereas MT may be a UE-like function that terminates the radio interface layers. As an example, the MT may function to perform at least one of: radio transmission and reception, encoding and decoding, error detection and correction, signaling, and access to a SIM.

Embodiments include a mobile network infrastructure where a number of UEs are connected to a set of IAB-nodes and the IAB-nodes are in communication with each other for relay and/or an IAB-donor using the different aspects of the present embodiments. In some embodiments, the UE may communicate with the CU of the IAB-donor on the C-Plane using RRC protocol and in other embodiments, using Service Data Adaptation Protocol (SDAP) and/or Packet Data Convergence Protocol (PDCP) radio protocol architecture for data transport (U-Plane) through NR gNB. In some embodiments, the DU of the IAB-node may communicate with the CU of the IAB-donor using 5G radio network layer signaling protocol: F1 Application Protocol (F1-AP*) which is a wireless backhaul protocol that provides signaling services between the DU of an IAB-node and the CU of an IAB-donor. That is, as further described below, the protocol stack configuration may be interchangeable, and different mechanism may be used.

Figure 3:
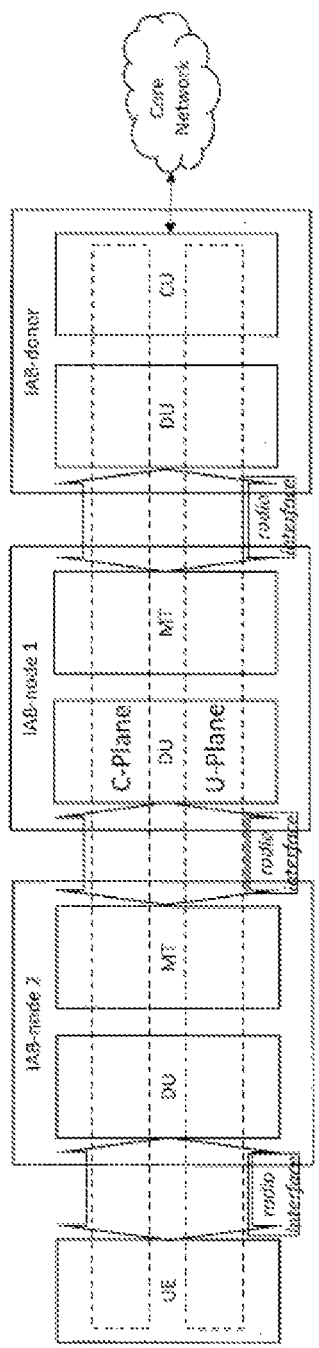
FIG. 3 illustrates Control Plane (C-Plane) and User Plane (U-Plane) protocols among the UE, IAB-nodes, and IAB-donor.

As illustrated by the diagram shown in FIG. 3, the protocols among the UE, IAB-nodes, and IAB donor are grouped into Control Plane (C-Plane) and User Plane (U-Plane). C-Plane carries control signals (signaling data), whereas the U-Plane carries user data. FIG. 3 shows an example of the embodiment where there are two IAB-nodes, IAB-node 1 and IAB-node 2, between the UE and the IAB-donor (two hops). Other embodiments may comprise a network with a single hop or multiple hops where there may be more than two IAB-nodes present.

Figure 4:
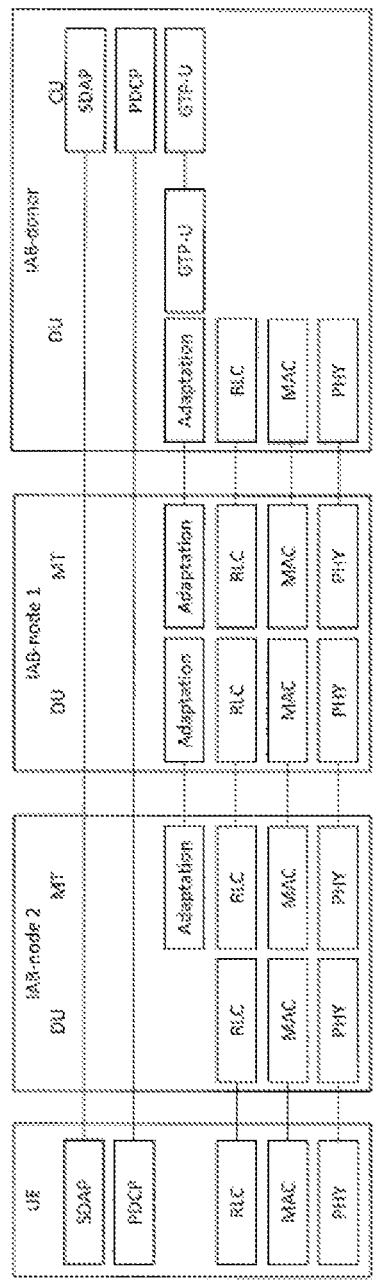
FIG. 4 depicts a functional block diagram of an example protocol stack configuration for the U-Plane.

FIG. 4 depicts a functional block diagram of an example protocol stack configuration for the U-Plane, the stack comprising Service Data Protocol (e.g., SDAP, 3GPP TS 38.324) which may carry user data (e.g., via IP packets). In one embodiment, the SDAP runs on top of PDCP (3GPP TS 38.323) and the L2/Physical layers. In one embodiment, an Adaptation Layer (e.g. Backhaul Adaptation Protocol, BAP, 3GPP TS 38.340) is introduced between the IAB-node and the IAB-node/donor, where the Adaptation Layer carries relay-specific information, such as IAB-node/donor addresses, QoS information, UE identifiers, and potentially other information. In this embodiment, RLC (3GPP TS 38.322) may provide reliable transmission in a hop-by-hop manner while PDCP may perform end-to-end (UE-CU) error recovery. GTP-U (GPRS Tunneling Protocol User Plane) may be used for routing user data between CU and DU inside the IAB-donor.

Figure 5A:
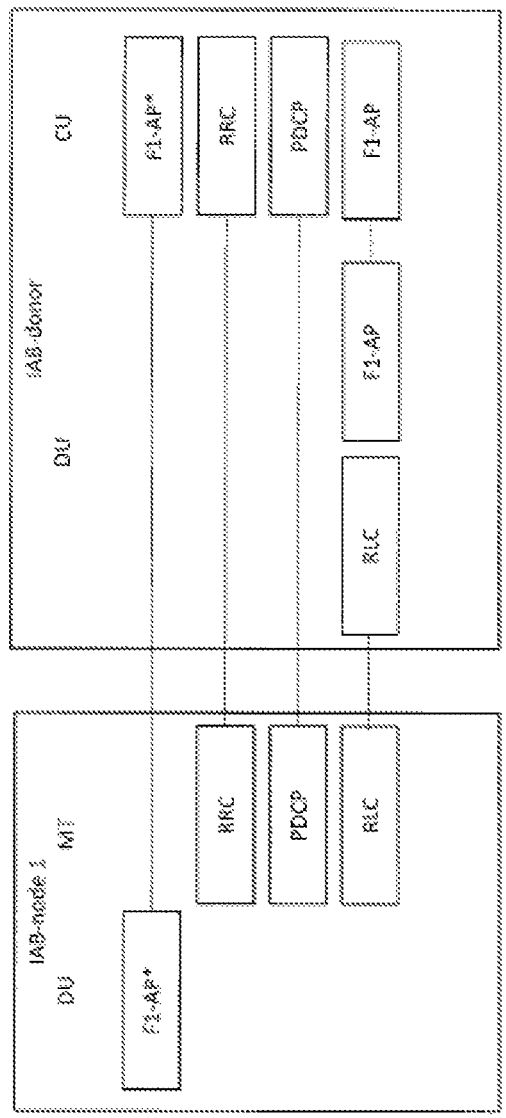
FIG. 5A depicts a functional block diagram of an example protocol stack configuration for the C-Plane between an IAB-node connected to an IAB-donor.

FIG. 5A is a functional block diagram of an example protocol stack configuration for the C-Plane between an IAB-node (IAB-node 1) directly connected to the IAB-donor (via a single hop). In this embodiment, the MT component of IAB-node 1 may establish an RRC connection with the CU component of the IAB-donor. In parallel, RRC may be used for carrying another signaling protocol in order for CU/IAB-donor to control the DU component resident in the IAB-node 1. In one embodiment, such a signaling protocol may be referred to as F1 Application Protocol* (F1-AP*), either the protocol referred as F1-AP specified in 3GPP TS 38.473 or a protocol based on the F1-AP with potential extended features to accommodate wireless backhauls (the original F1-AP is designed for wirelines). In other embodiments, F1-AP may be used for CU-DU connection inside the IAB-donor. It is assumed that below RLC, MAC/PHY layers are shared with the U-Plane.

Figure 5B:
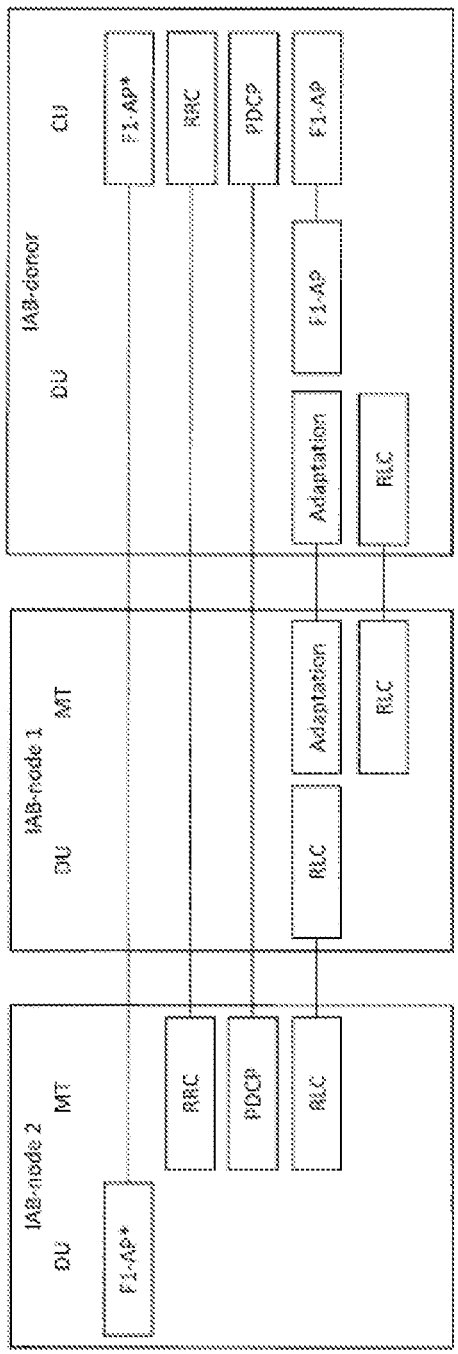
FIG. 5B depicts a functional block diagram of an example configuration of the C-Plane protocol stack for an IAB-node connected to another IAB-node which is connected to an IAB-donor.

FIG. 5B depicts a functional block diagram of an example configuration of the C-Plane protocol stack for IAB-node 2, an IAB-node connected to the aforementioned IAB-node 1 (2 hops). In one embodiment, it may be assumed that the IAB-node 1 has already established RRC/F1-AP* connections with the IAB-donor as shown in FIG. 5A. In IAB-node 1 the signaling bearer for IAB-node 2 RRC/PDCP may be carried by the Adaptation Layer to the IAB-donor. Similar to FIG. 5A, the F1-AP* signaling is carried by the RRC of IAB-node 2.

Figure 5C:
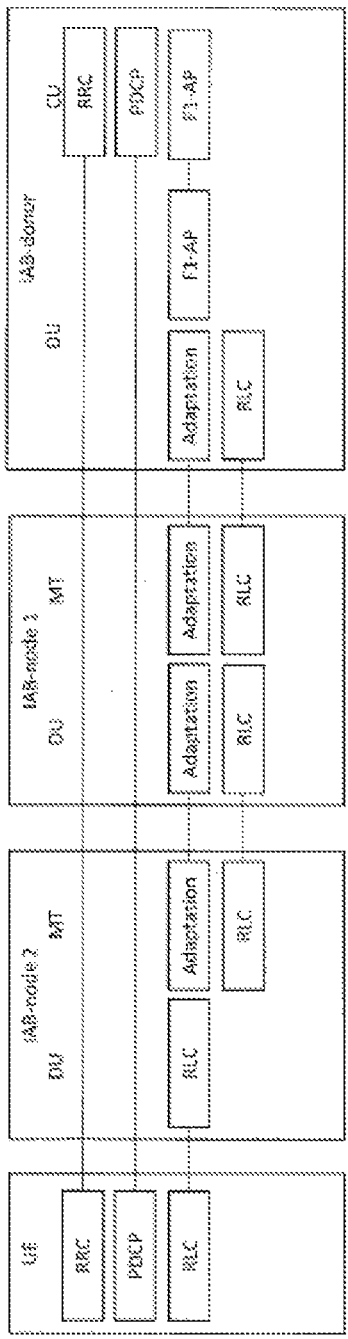
FIG. 5C depicts a functional block diagram of an example configuration of the C-Plane protocol stack for a UE's RRC signaling.

FIG. 5C depicts yet another functional block diagram of an example configuration of the C-Plane protocol stack for UE's RRC signaling under the 2-hop relay configuration shown in FIG. 5B. Accordingly, the UE having an MT component and functionality, via the C-Plane, may be connected to the CU of the IAB-donor. Though traffic is routed through IAB-node 2 and IAB-node 1, as depicted, the two nodes are passive nodes in that the data is passed to the next node(s) without manipulation. That is, data is transmitted by the UE to the node it is connected to, e.g., IAB-node 2, and then IAB-node 2 transmits the data to the node that is connected to, e.g., IAB-node 1, and then IAB-node 1 transmits the data (without manipulation) to the IAB-donor.

FIGS. 5A, 5B, and 5C illustrate that the MT of each IAB-node or UE has its own end-to-end RRC connection with the CU of the IAB-donor. Likewise, the DU of each IAB-node has an end-to-end F1-AP* connection with the CU of the IAB-donor. Any IAB nodes present between such end points transparently convey RRC or F1-AP signaling traffic.

Figure 6A:
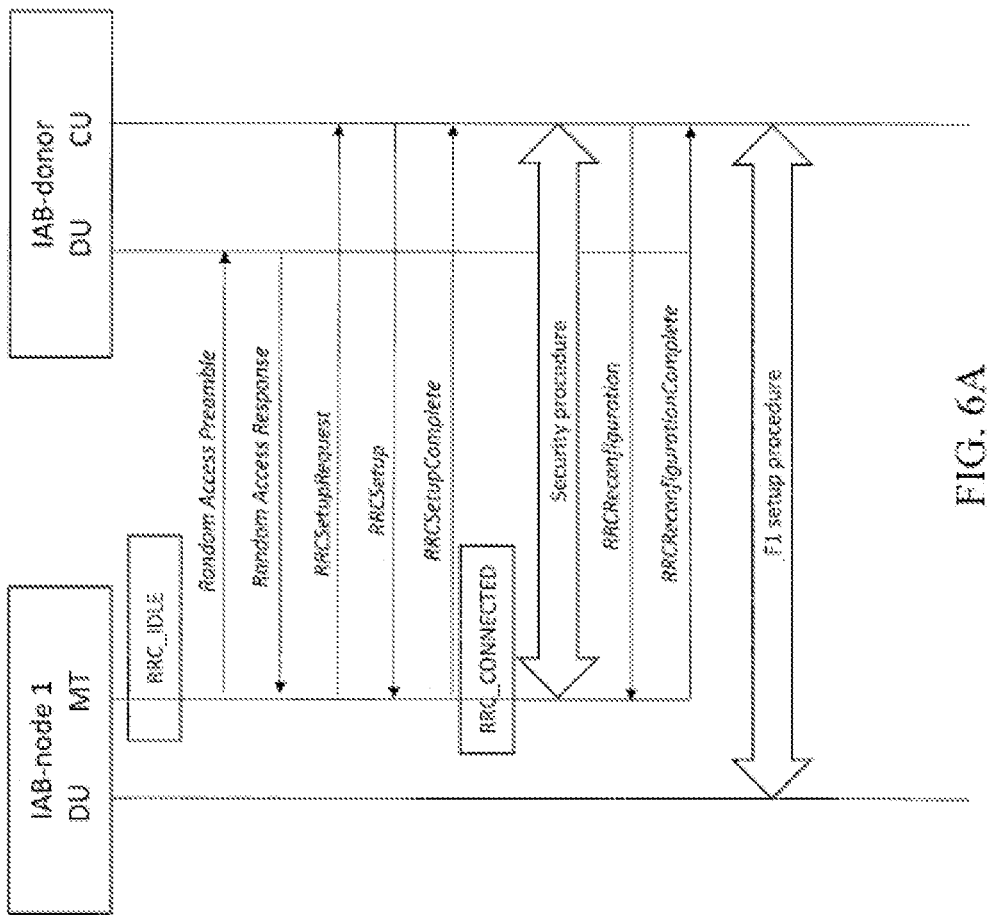
FIG. 6A depicts an example message sequence for an IAB-node to establish an RRC connection, followed by F1-AP* connection.
Figure 6B:
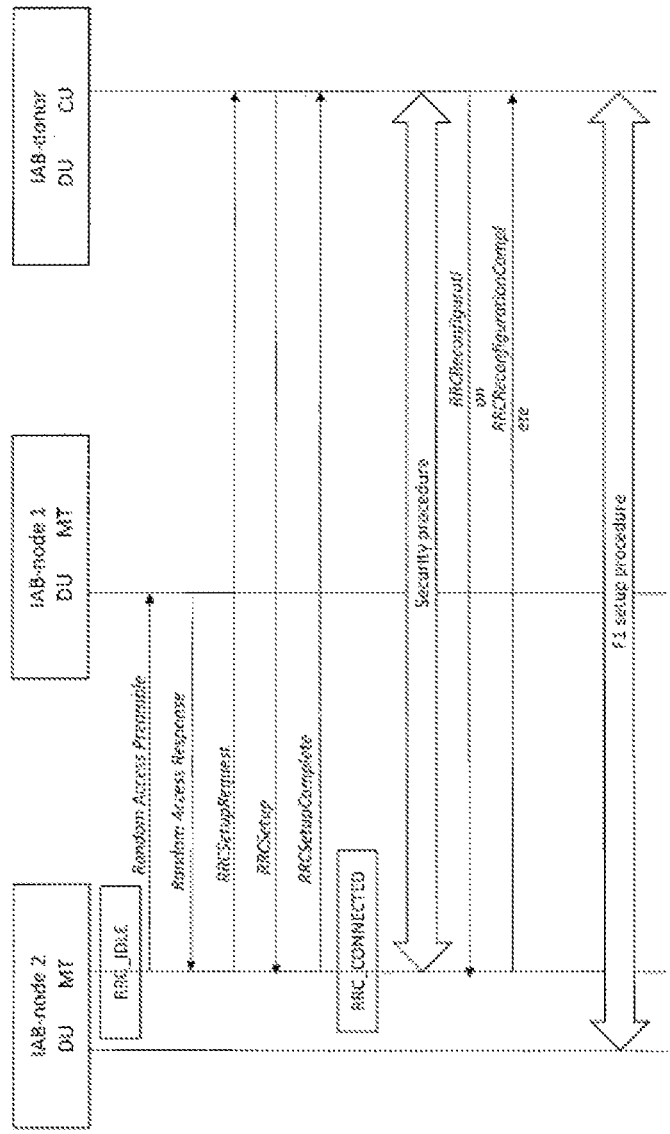
FIG. 6B depicts an example message sequence for IAB-node to establish an RRC connection with an IAB-donor, followed by the F1 setup procedure.

FIGS. 6A and 6B are diagrams of an example flow of information transmit/receive and/or processing by IAB-node(s) and an IAB-donor according to aspects of the present embodiments.

FIG. 6A depicts an example message sequence for IAB-node 1 to establish an RRC connection, followed by F1-AP* connection. It is assumed that IAB-node 1 has been pre-configured (or configured by the network) with information that instructs how to select a cell served by the IAB-donor. As shown in the figure, IAB-node 1—in an idle state (RRC_IDLE)—may initiate an RRC connection establishment procedure by sending Random Access Preamble to the IAB-donor, which may be received and processed by the DU of the IAB-donor. Upon successful reception of Random Access Response from the IAB-donor, IAB-node 1 may send a RRCSetupRequest, followed by reception of an RRCSetup and transmission of RRCSetupComplete. At this point of the message sequence, the IAB-node 1 may enter a connected state (RRC_CONNECTED) with the IAB-donor, and may proceed with a security procedure to configure encryption/integrity protection features. The CU of the IAB-donor may further send an RRCReconfiguration to IAB-node 1, which may comprise configuration parameters to configure radio bearers (e.g., data radio bearers (DRBs) and signaling radio bearers (SRBs)). In some embodiments, the RRCReconfiguration is sent to modify an RRC connection and establish Radio Connection between a UE and the network, however, in the present embodiment, the RRCReconfiguration may also be sent to configure a connection between an IAB-node and the network. RRC Connection Reconfiguration messages may be used to, for example, establish/modify/release Radio Bearers, and/or perform handover, etc. In one embodiment, any of the RRC messages transmitted from IAB-node 1 may include information identifying the IAB-node 1 as an IAB-node (not as a UE). For example, the Donor CU may be configured with a list of node identities (e.g., IMSI or S-TMSI) that may be allowed to use the service from the donor. The information may be used by the CU in the subsequence operations, for example, to distinguish a UE from an IAB-node.

As described above, following the RRC connection establishment procedure, the DU of IAB-node 1 and IAB-donor may proceed with F1 setup procedure using the F1-AP* protocol, which may activate one or more cells served by the DU of IAB-node 1—thereby allowing other IAB nodes and/or UEs to camp on the cell. In this procedure, the Adaptation Layer for IAB-node 1 and IAB-donor may be configured and activated as well.

FIG. 6B depicts an example message sequence or flow of information for IAB-node 2 to establish an RRC connection with IAB-donor, followed by the F1 setup procedure. It is assumed in this embodiment that IAB-node 1 has already performed the process disclosed in FIG. 6A to establish an RRC and F1-AP* connection. Referring back to FIG. 3, the IAB-node 2 shown in communication via the radio interface with IAB-node 1, may be also depicted in FIG. 6B as a child node of IAB-node 1 according to aspects of the present embodiments.

Due to the nature of wireless communications, the wireless backhaul links are susceptible to be deteriorated or broken at any time. In aspects of the present embodiments, the MT part of an IAB-node may constantly monitor the quality of the radio link and/or signal quality on the upstream of the IAB-node, where the radio link may be to a parent IAB node/donor of the IAB-node. If radio problems cannot be recovered in a designated duration, the MT may declare Radio Link Failure (RLF), meaning a loss of communication link may have occurred or signal strength is weak to continue (e.g., below a threshold).

Figure 7:
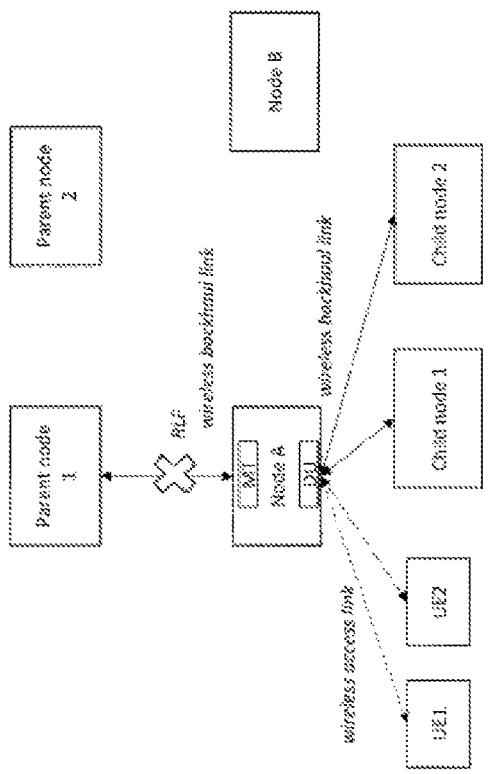
FIG. 7 shows an example diagram of a scenario where an IAB-node detects a Radio Link Failure (RLF) on the upstream link to its parent node.

FIG. 7 shows an example diagram of a scenario where an IAB-node (Node A) detects RLF on the upstream link to its parent node (Parent node 1). In some embodiments, the MT component of Node A may need to find another parent that is visible from the node. In this case, the MT component may perform a cell selection procedure, and if a suitable cell (Parent node 2) is successfully found, the Node A may then proceed with an RRC reestablishment procedure with the suitable cell (Parent node 2). It should be noted that Node A in this scenario needs to find a cell served by either an IAB-node or an IAB-donor (i.e., non-IAB-capable cells are not suitable). In one embodiment, a cell served by either an IAB-node or an IAB-donor may broadcast (e.g., in the system information), such as MIB, system information block type 1 (SIB1) or any of the other SIBs) a state, e.g., via a flag, as an indication indicating the IAB capability, which may further comprise an indication of the IAB functionality, a node type (IAB-node or IAB-donor) and/or the current state of the connectivity to the parent node. Alternatively, or in parallel, Node A may have been pre-configured or configured by the network with a list of IAB-capable cell identifications.

While Node A is trying to find a new suitable IAB-capable serving cell, the child IAB nodes (Child node 1 and Child node 2) and/or UEs (UE1 and UE2) may still be in connected mode with Node A. If Node A successfully recovers from the RLF before expiration of a pre-configured (or network-configured) period of time, the child nodes and/or the UEs may not be aware of the RLF. However, in the scenario where Node A fails or has failed to recover from the RLF in a timely manner (e.g., before expiration of a pre-configured/network-configured period of time), not only may these child nodes/UEs suffer discontinuity of service, but also all the nodes/UEs in the downstream may also suffer discontinuity of service.

The present embodiments disclose systems, methods, and device where an IAB-node may inform connected nodes (child nodes) or UEs, of the upstream radio conditions. In some embodiments, the upstream radio condition information may enable the child nodes or UEs to decide to stay connected with the IAB-node or to look for another node to connect to.

Figure 8:
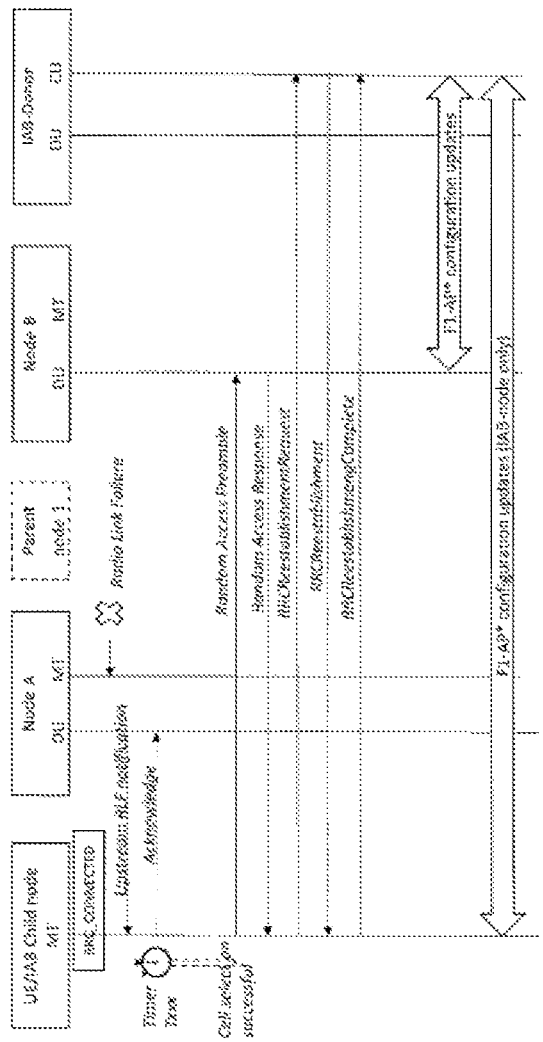
FIG. 8 illustrates an example flow of information transmit/receive and/or processing by a UE and/or IAB-node connected to a set of IAB-nodes in communication with an IAB-donor, for processing a notification of an RLF.

FIG. 8 shows an example scenario for Upstream RLF notification, a notification of an RLF, sent from a node (Node A) and detected on the node's upstream, to the child nodes and/or the directly connected UEs. In one embodiment, upon receiving the notification, each of the child nodes and/or UEs may perform cell selection and, if successful, proceed to RRC reestablishment. As shown in FIG. 8, each of the child nodes and/or UEs, after a successful selection to a new node (Node B), may start the reestablishment procedure through Node B. That is, once a successful selection is made, the child nodes and/or UEs may transmit Random Access Preamble/Response messages, followed by RRCReestablishmentRequest and subsequent messages as illustrated in FIG. 8.

In one embodiment, Upstream RLF notification may be carried by the Adaptation Layer (e.g., a header part or a message body of the Adaptation Layer protocol). In an alternate embodiment, or in addition to, the notifications may be carried by the RLC sublayer, MAC, or a physical layer signaling (e.g., PDCCH). Additionally, or alternatively, the notifications may be broadcasted via system information (e.g., MIB, SIB1 or any of the other SIBs) or transmitted in a dedicated manner.

Accordingly, in one embodiment, RRC resident in each of the child nodes and/or UEs may perform cell selection upon receiving a notification indicating the reception of the Upstream RLF notification from lower layers. In the present embodiments, this may be performed even if the radio link to the parent node remains in good condition. The node and/or UE may then start a timer, timer Txxx (e.g., T311 specified in 3GPP TS 38.331), based on the received notification, and upon selecting a suitable cell while timer Txxx is running, the node and/or UE may stop timer Txxx and initiate transmission of RRCReestablishmentRequest to the IAB-donor.

Once the RRC connection is reestablished, the CU of the IAB-donor may update the F1-AP* configurations in Node B as well as the child IAB-node that initiated the RRC reestablishment. In the scenario where the connecting device is a UE, F1-AP* configuration updates are not needed as they do not have the F1-AP* interface. Accordingly, the updated configuration from the IAB-donor may be used to reconfigure the routing topology which was modified or changed due to the RLF.

Figure 9A:
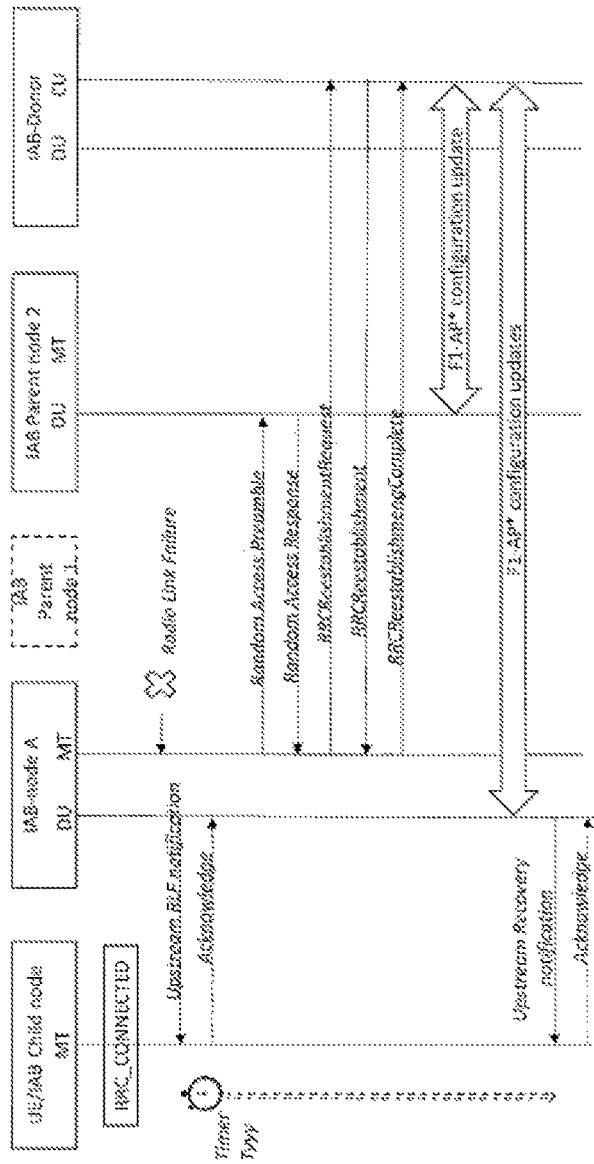
FIG. 9A illustrates an example flow of information transmit/receive and/or processing by a UE and/or IAB-node connected to a set of IAB-nodes in communication with an IAB-donor, based on receiving an Upstream RLF notification.

FIG. 9A shows another scenario where the child nodes and/or UEs may start a timer, for example, timer Tyyy, based on receiving an Upstream RLF notification. While the timer Tyyy is running, Node A may attempt to recover the upstream link by performing cell selection. In the scenario depicted in FIG. 9, Node A has successfully found a new parent node (Parent node 2) and may initiate the RRC reestablishment procedure. Node A, based on receiving F1-AP* configuration update from the CU of the IAB-donor, may transmit/send Upstream Recovery notification-a notification indicating that the upstream is recovered—to the child IAB-node and/or the UEs. If timer Tyyy has not expired yet, the child IAB-node and/or the UEs that receive the notification may stop timer Tyyy and stay connected with Node A. If the timer expires before receiving Upstream Recovery notification, the child IAB-node and/or the UEs may perform cell selection/RRC reestablishment as shown in FIG. 8. In one embodiment, the timer value/configuration may be pre-configured. In another embodiment, the timer value/configuration may be configured by the parent node (e.g., Parent node 1) via a dedicated signaling or via a broadcast signaling (e.g., system information, such as MIB, SIB1 or any of the other SIBs).

Similar to the previous scenario, in one embodiment, the Upstream RLF notification may be carried by the Adaptation Layer, RLC, MAC, or a physical layer signaling. Additionally, the notifications may be broadcasted via system information (e.g., MIB, SIB1 or any of the other SIBs) or transmitted in a dedicated manner.

In yet another embodiment for this scenario, RRC resident in each of the child nodes and/or UEs may start timer Tyyy upon receiving Upstream RLF notification from the lower layers. If the node and/or UE receive a notification indicating the reception of the Upstream RLF notification from lower layers while timer Tyyy is running, the node and/or UE may stop timer Tyyy. If timer Tyyy expires, the node and/or UE may then start timer Txxx and upon selecting a suitable cell while the timer is running, the node and/or UE may stop the timer and initiate transmission of RRCReestablishmentRequest.

Figure 9B:
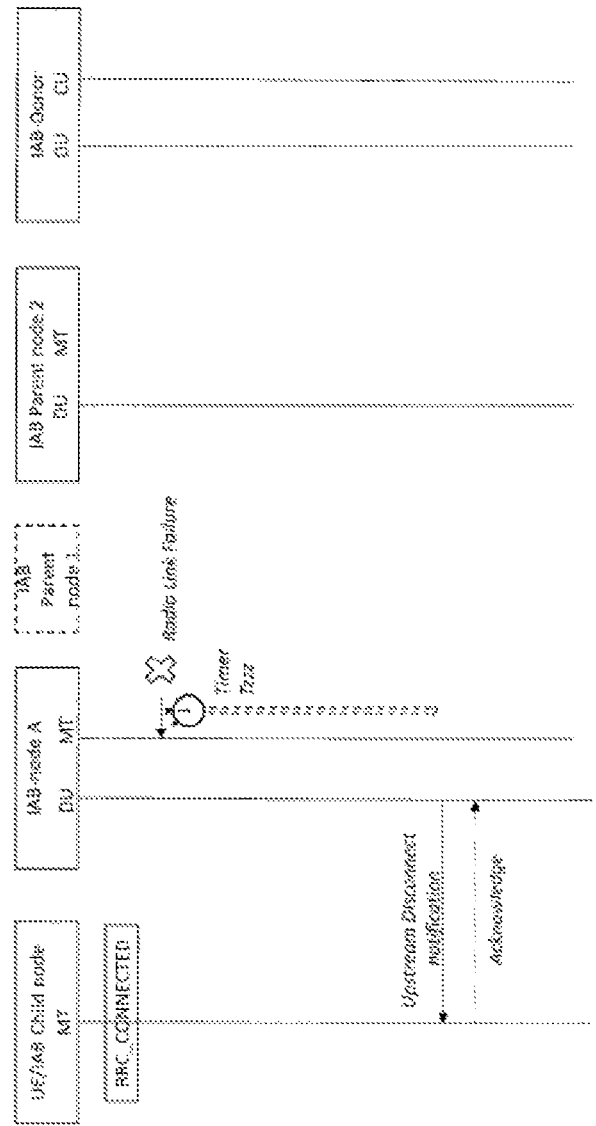
FIG. 9B illustrates another example flow of information transmit/receive and/or processing by a UE and/or IAB-node connected to a set of IAB-nodes in communication with an IAB-donor, based on not having received an Upstream RLF notification.

FIG. 9B shows yet another scenario where Node A may start a timer Tzzz upon detecting an RLF. In this scenario, Node A may or may not send the aforementioned Upstream RLF notification to the child IAB-nodes and/or UEs. While the timer Tzzz is running, Node A may attempt to recover the upstream link by performing cell selection. In the scenario depicted in FIG. 9B, at the timer Tzzz expiry (cell selection failure), Node A may send a notification (e.g. Upstream Disconnect notification) to the child IAB-nodes/UEs notifying the unsuccessful RLF recovery. In this case, the child IAB-nodes/UEs that receive the notification may start the aforementioned timer Txxx and initiate the cell selection procedure as shown in FIG. 8. The notification may be carried by the Adaptation Layer, RLC, MAC, or a physical layer signaling, in a broadcast or a dedicated manner. In one embodiment, the timers Txxx and Tzzz may be the same timer or share same configurations. In another embodiment, the timers Txxx and Tzzz may be different timers or differently configured.

Additionally, notifications that an IAB-node provides to its downstream (children/UEs) may not be limited to RLF or RLF recovery. In some embodiments, the IAB-node may inform child nodes and/or UEs of the signal quality (e.g., Reference Signal Received Power (RSRP), Reference Signal Received Quality (RSRQ)), error rates, and/or any other types of measurements that indicate the radio condition of the upstream. In this case, IAB-nodes and/or UEs may be pre-configured or configured by the network with conditions for initiating cell selection/reestablishment. The notifications may be carried by the Adaptation Layer, RLC, MAC, or a physical layer signaling, in a broadcast or a dedicated manner.

In one embodiment, upon receiving one of the notifications from the parent node, the IAB-node and/or UE may send back or respond with an acknowledgement to the parent node, as shown in FIG. 8, FIGS. 9A and 9B.

Figure 10:
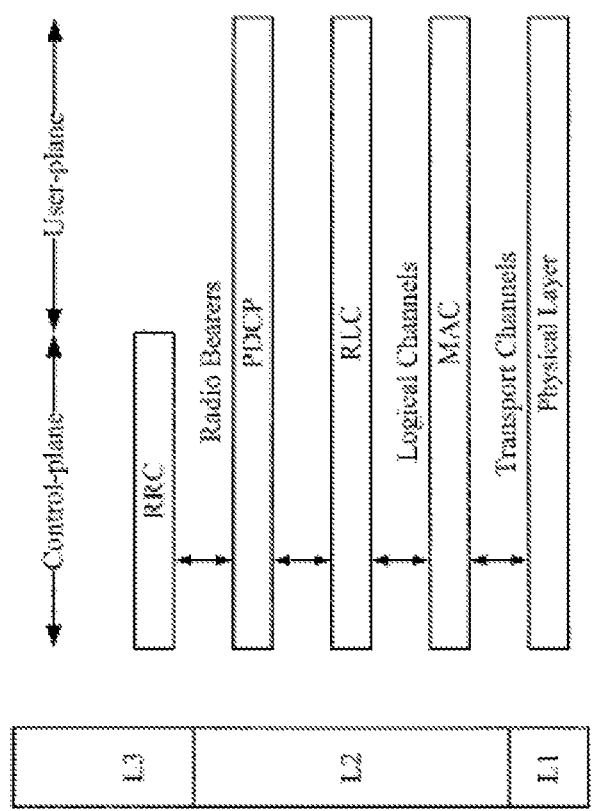
FIG. 10 is a diagram illustrating an example of a radio protocol architecture for the control and user planes in a mobile communications network.

FIG. 10 is a diagram illustrating an example of a radio protocol architecture for the control and user planes in a mobile communications network. The radio protocol architecture for the UE and/or the gNodeB may be shown with three layers: Layer 1, Layer 2, and Layer 3. Layer 1 (L1 layer) is the lowest layer and implements various physical layer signal processing functions. Layer 2 (L2 layer) is above the physical layer and responsible for the link between the UE and/or gNodeB over the physical layer. In the user plane, the L2 layer may include a media access control (MAC) sublayer, a radio link control (RLC) sublayer, and a packet data convergence protocol (PDCP) sublayer, which are terminated at the gNodeB on the network side. Although not shown, the UE may have several upper layers above the L2 layer including a network layer (e.g., IP layer) that is terminated at the PDN gateway on the network side, and an application layer that is terminated at the other end of the connection (e.g., far end UE, server, etc.). The control plane also includes a radio resource control (RRC) sublayer in Layer 3 (L3 layer). The RRC sublayer is responsible for obtaining radio resources (i.e., radio bearers) and for configuring the lower layers using RRC signaling between the IAB-nodes and/or the UE and an IAB-donor.

Figure 11:
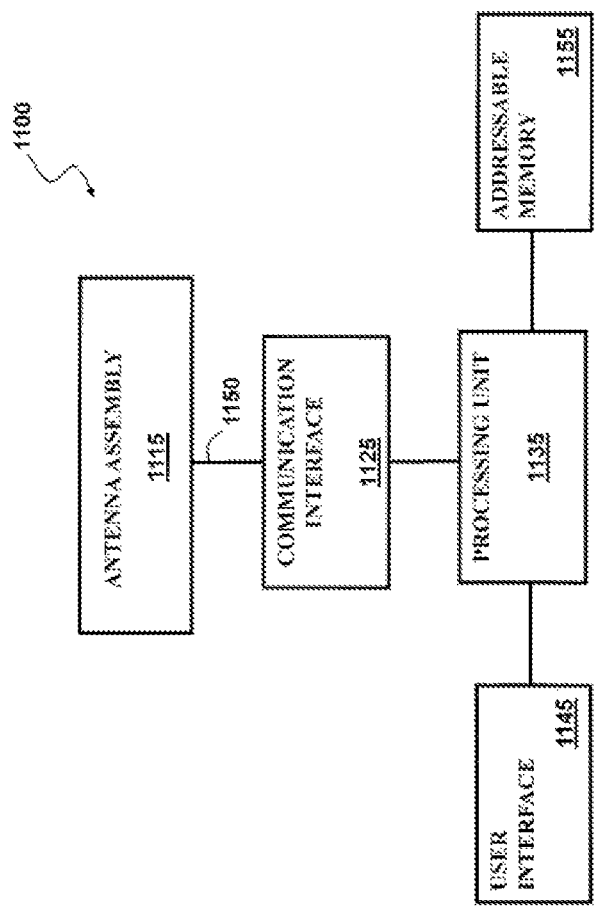
FIG. 11 illustrates an example of a set of components of a user equipment or base station.

FIG. 11 illustrates an embodiment of a UE and/or base station comprising components of a computing device 1100 according to the present embodiments. The device 1100 illustrated may comprise an antenna assembly 1115, a communication interface 1125, a processing unit 1135, a user interface 1145, and an addressable memory 1155. In some embodiments, the antenna assembly 1115 may be in direct physical communication 1150 with the communication interface 1125. The addressable memory 1155 may include a random access memory (RAM) or another type of dynamic storage device, a read only memory (ROM) or another type of static storage device, a removable memory card, and/or another type of memory to store data and instructions that may be used by the processing unit 1135. The user interface 1145 may provide a user the ability to input information to the device 1100 and/or receive output information from the device 1100. The communication interface 1125 may include a transceiver that enables mobile communication device to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. The communication interface 1125 may include a transmitter that converts baseband signals to radio frequency (RF) signals and/or a receiver that converts RF signals to baseband signals. The communication interface 1125 may also be coupled (not shown) to antenna assembly 1115 for transmitting and receiving RF signals. Additionally, the antenna assembly 1115 may include one or more antennas to transmit and/or receive RF signals. The antenna assembly 1115 may, for example, receive RF signals from the communication interface and transmit the signals and provide them to the communication interface.

Figure 12:
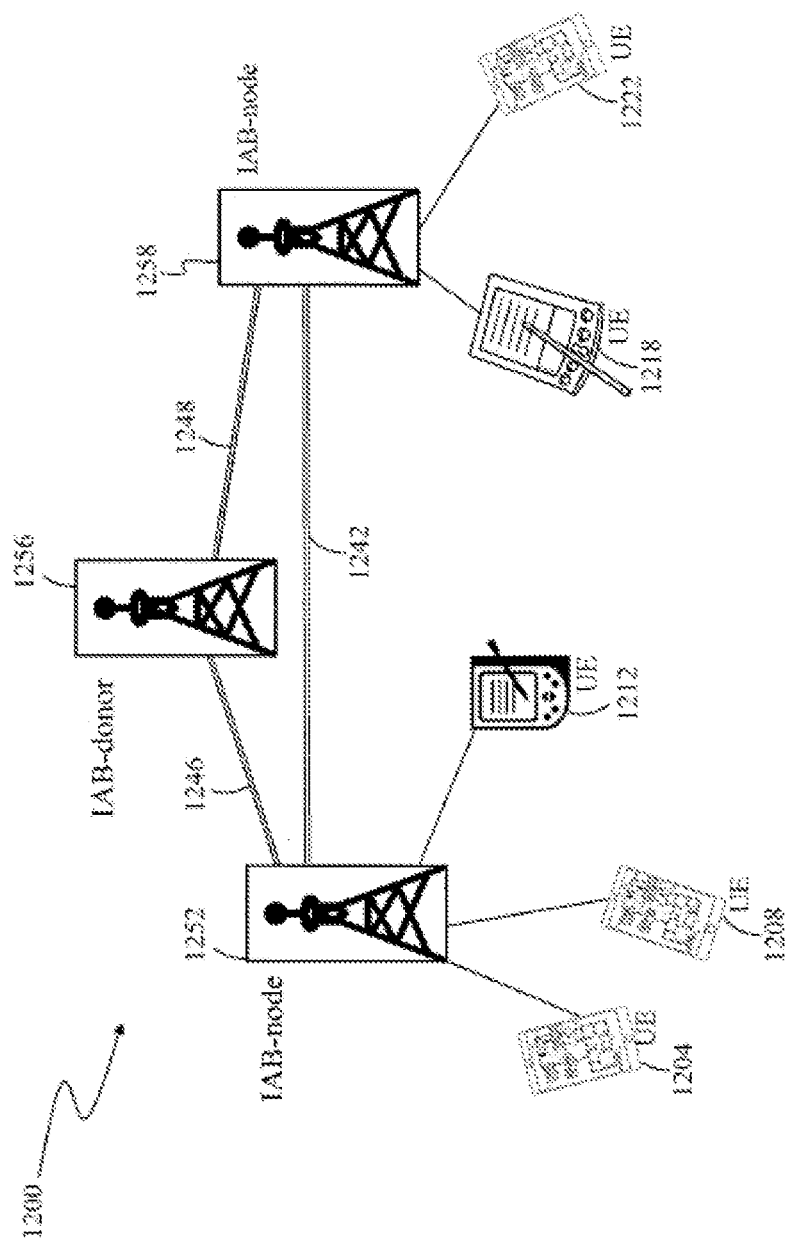
FIG. 12 illustrates a mobile network infrastructure where a number of UEs are connected to a set of IAB-nodes and the IAB-nodes are in communication with each other and/or an IAB-donor.

FIG. 12 depicts an example of a mobile network infrastructure 1200 where a number of UEs and IAB-nodes, comprising components of a computing device as illustrated in FIG. 11, are illustrated in communication with each other. In one embodiment, a plurality of UEs 1204, 1208, 1212, 1218, 1222 are connected to a set of IAB-nodes 1252, 1258 and the IAB-nodes 1252, 1258 are in communication with each other 1242 and/or an IAB-donor 1256 using the different aspects of the present embodiments. That is, the IAB-nodes 1252, 1258 may send out discovery information to other devices on the network (e.g., the Cell ID and resource configuration of the transmitting nodes are sent to the receiving node) and also provide MT functionality in connecting to the IAB-donor 1256. The examples of UEs may also be receiving discovery information and if not barred, then requesting connections and to use resources by transmitting connection requests to the IAB-nodes and/or IAB-donors. In one embodiment, an IAB-donor 1256 may limit or bar any requests from UEs for connection due to them being already connected to other IAB-nodes and committed resources to the backhaul traffic. In another embodiment, the IAB-donor 1256 may accept the UE's connection request but prioritize the IAB-node backhaul traffic over any connections used by the UE's. In yet another embodiment, the IAB-donor 1256 and/or IAB-nodes 1252, 1258 may detect and communicate RLFs according to the aspects of the current embodiments, which may then be propagated down between IAB-nodes and UEs, where the child nodes (e.g., IAB-node or UE in the network) may detect upstream connection failures.

Figure 13:
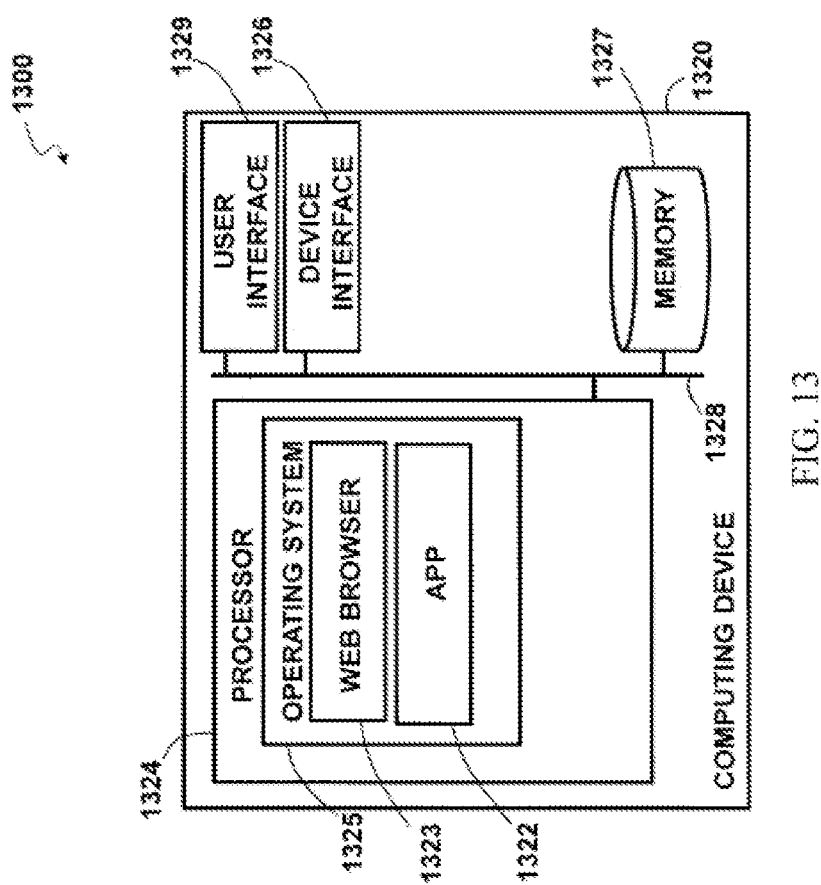
FIG. 13 illustrates an example top level functional block diagram of a computing device embodiment.

FIG. 13 illustrates an example of a top level functional block diagram of a computing device embodiment 1300. The example operating environment is shown as a computing device 1320 comprising a processor 1324, such as a central processing unit (CPU), addressable memory 1327, an external device interface 1326, e.g., an optional universal serial bus port and related processing, and/or an Ethernet port and related processing, and an optional user interface 1329, e.g., an array of status lights and one or more toggle switches, and/or a display, and/or a keyboard and/or a pointer-mouse system and/or a touch screen. Optionally, the addressable memory may, for example, be: flash memory, eprom, and/or a disk drive or other hard drive. These elements may be in communication with one another via a data bus 1328. In some embodiments, via an operating system 1325 such as one supporting a web browser 1323 and applications 1322, the processor 1324 may be configured to execute steps of a process establishing a communication channel and processing according to the embodiments described above.

Figure 14:
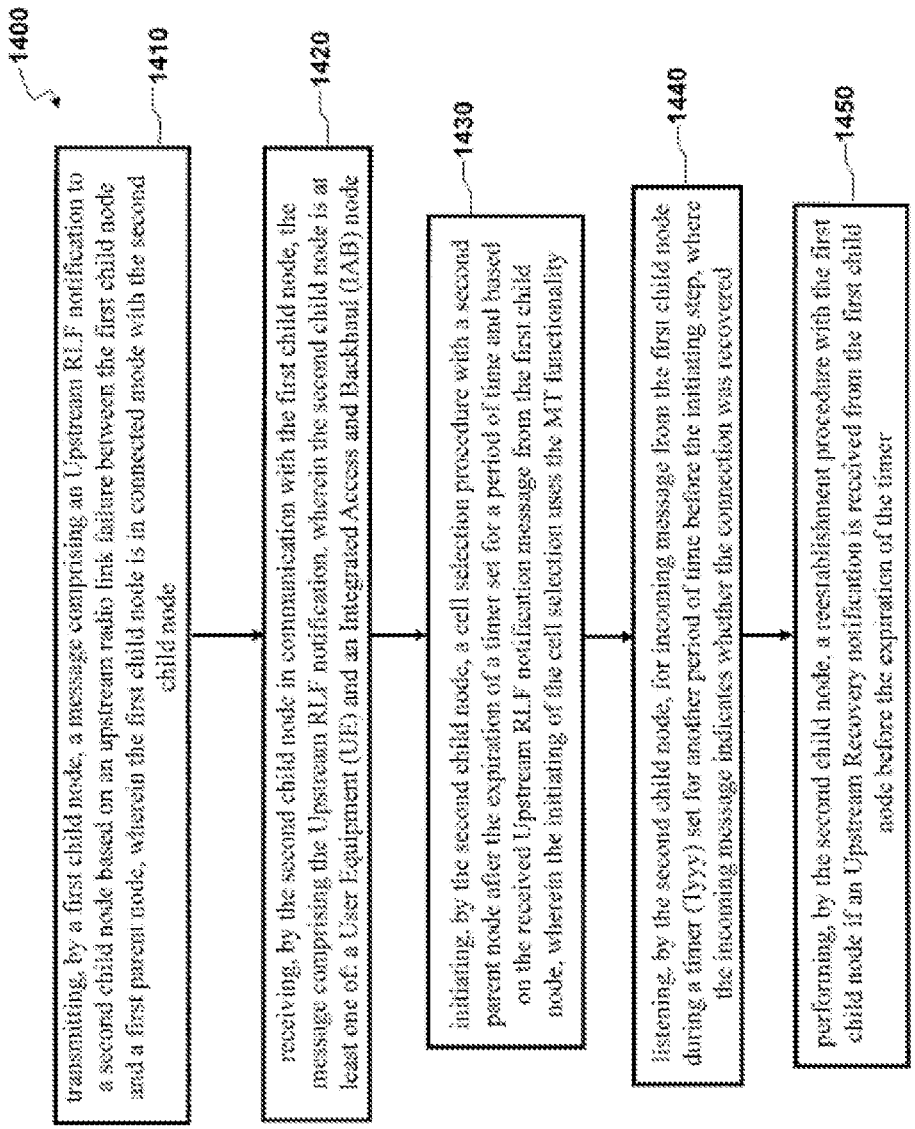
FIG. 14 is a flowchart depicting an exemplary process for handling an RLF in an example of a wireless relay network.

FIG. 14 is a flowchart of an exemplary process 1400 method of handling Radio Link Failures (RLF) in a Wireless Relay Network in which the system comprises a computer and/or computing circuitry that may be configured to execute the steps as depicted. Additionally, the wireless relay network may have a donor node, a first parent node, a second parent node, a first child node, and a second child node, where the donor node may be an Integrated Access and Backhaul (IAB) node connected to a core network, and where the first parent node, the second parent node, the first child node, and the second child node each may have Mobile Termination (MT) functionality capabilities. The method depicted in the flowchart includes the steps of: (a) transmitting, by a first child node (IAB-node A), a message comprising an Upstream RLF notification to a second child node (UE/IAB Child node) based on an upstream radio link failure between the first child node and a first parent node (IAB Parent node 1), wherein the first child node is in connected mode with the second child node (step 1410); (b) receiving, by the second child node in communication with the first child node, the message comprising the Upstream RLF notification, where the second child node may be either: a User Equipment (UE) or an Integrated Access and Backhaul (IAB) node having MT capabilities (step 1420); (c) initiating, by the second child node, a cell selection procedure with a second parent node (IAB Parent node 2) before the expiration of a timer (Txxx) set for a period of time and based on the received Upstream RLF notification message from the first child node, wherein the initiating of the cell selection uses the MT functionality (step 1430); (d) listening, by the second child node, for incoming message from the first child node during a timer (Tyyy) set for another period of time before the initiating step, where the incoming message indicates whether the connection between the first child node and the first parent node was recovered (step 1440); and (e) performing, by the second child node, a reestablishment procedure with the first child node if an Upstream Recovery notification is received from the first child node that the connection between the first child node and the first parent node was recovered before the expiration of the timer.

Figure 15A:
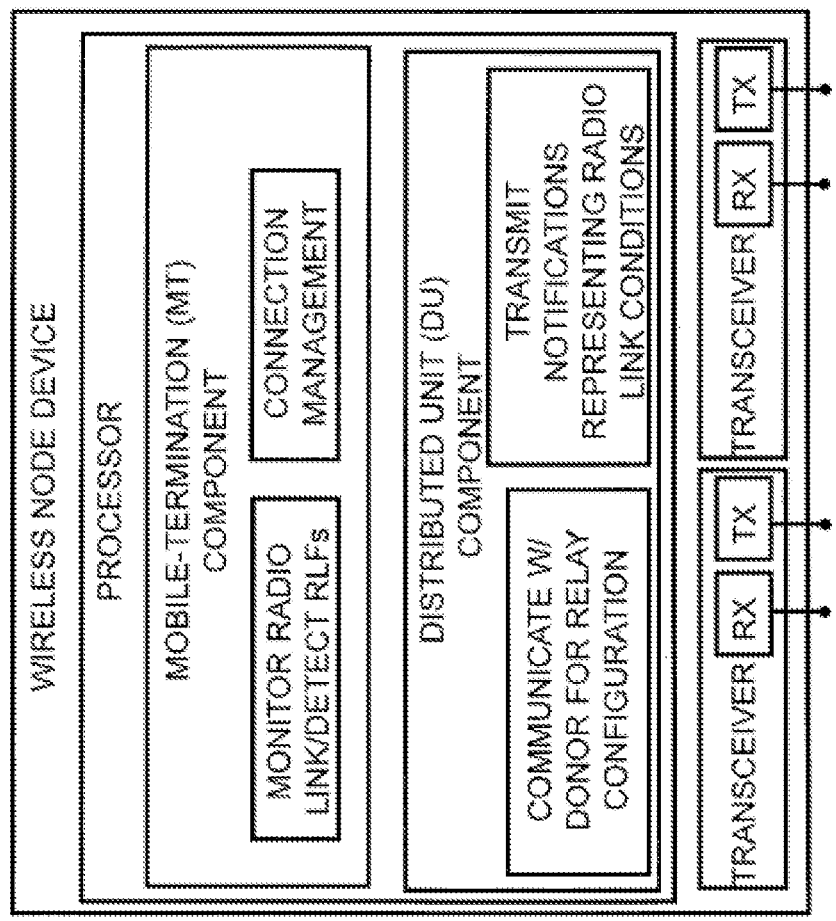
FIG. 15A is a functional block diagram of an IAB-node in communication with an IAB-donor and UE having a Mobile-Termination (MT) component.

FIG. 15A is a functional block diagram of a wireless node device which may be a parent IAB-node which may be in communication with an IAB-donor upstream and a UE and/or child IAB-node downstream. The parent IAB-node may include a processor and two transceivers, where each transceiver may have a transmitter component and receiver component, and in some embodiments, one transceiver may be used for connection to and communications with upstream devices (upstream radio links) and the other used for connection to and communications with downstream devices (downstream radio links). That is, in one embodiment, one transceiver may be dedicated to communicating with IAB-donors/parent IAB-nodes (via a Mobile-Termination (MT) Component) and the other transceiver with child IAB-nodes and/or UEs (via a Distributed Unit (DU) Component). The mobile-termination component may provide a function that terminates the radio interface layers, similar to a UE but implemented on the IAB-nodes as disclosed herein. The example wireless node device depicted in FIG. 15A may further include a processor which may comprise the Mobile-Termination (MT) Component and the Distributed Unit (DU) Component. In this embodiment, the MT component may be configured to monitor the radio link and detect radio link conditions on the upstream radio links, such as Radio Link Failures (RLFs). The MT component may also include a connection management that may provide at least cell selection, connection establishment and reestablishment functionality. The DU component may be configured to communicate with the IAB-donor for relay configuration. The DU component may also be configured to process the detected radio link conditions and transmit notifications representing the radio link conditions to the downstream nodes.

Figure 15B:
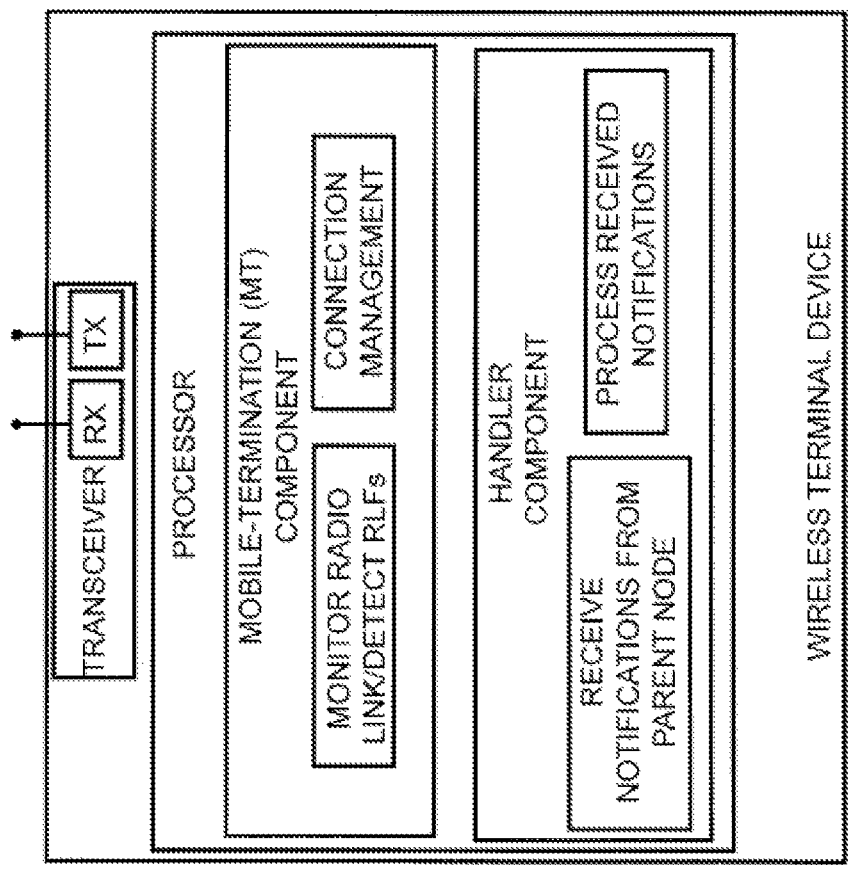
FIG. 15B is a functional block diagram of an IAB-node in communication with an IAB-donor and UE having a Mobile-Termination (MT) component.

FIG. 15B is a functional block diagram of a wireless terminal device which may be a UE and/or child IAB-node in communication with an IAB-donor or a parent IAB-node upstream (itself in communication with an IAB-donor). The wireless terminal device may include a transceiver having a transmitter and receiver for communicating with other IAB-donors/nodes upstream. The example wireless node device depicted in FIG. 15B may further include a processor which may comprise the Mobile-Termination (MT) Component and Handler Component. In this embodiment, the MT component may be configured to monitor the radio link and detect any Radio Link Failures (RLFs). The MT component may also include a connection management that may provide at least cell selection, connection establishment and reestablishment functionality. The handler component may be configured to receive notifications from a parent node, for example, an IAB-donor or parent IAB-node upstream, the notifications representing radio conditions of the parent node's upstream radio links. The handler component may also be configured to process the received notifications from upstream nodes according to the aspects of the different embodiments. Upon processing of the notifications, the handler component may instruct the connection management to perform designated actions (e.g. cell selection).

The abovementioned features may be applicable to 3rd Generation Partnership Project; Technical Specification Group Radio Access Network; Study on Integrated Access and Backhaul; (Release 15) for 3GPP TR 38.874 V0.3.2 (2018-06) and applicable standards.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

The technology disclosed herein encompasses one or more of the following non-limiting, non-exclusive example embodiments and modes:

EXAMPLE 1

A wireless node equipped with at least two radio interfaces comprising a first interface and a second interface, the first interface being configured to establish a first radio link with at least one parent node, the second interface being configured to establish a second radio link(s) with one or more wireless terminals, the wireless node comprising:
  receiver circuitry configured to receive, for the first interface, downlink (DL) user data and/or DL signaling data;
  transmitter circuitry configured to transmit, for the first interface, uplink (UL) user data and/or UL signaling data;
  receiver circuitry configured to receive, for the second interface, UL user data and/or UL signaling data;
  transmitter circuitry configured to transmit, for the second interface, DL user data and/or DL signaling data;
  processor circuitry configured to:
  relay the DL user data and/or DL signaling data from the first interface to the second interface;
  relay the UL user data and/or UL signaling data from the second interface to the first interface;
  monitor a radio condition on the first radio link for the first interface;
  wherein radio link information representing the radio condition on the first radio link is transmitted on the second radio link for the second interface.

EXAMPLE 2

The wireless node of Example 1, wherein the parent node is a donor node connected with a core network.

EXAMPLE 3

The wireless node of Example 1, wherein the parent node is another wireless node.

EXAMPLE 4

The wireless node of Example 1, wherein the radio link information corresponds to a radio link failure on the first radio link.

EXAMPLE 5

The wireless node of Example 1, wherein the radio link information corresponds to a recovery from a radio link failure on the first radio link.

EXAMPLE 6

The wireless node of Example 1, wherein the radio link information corresponds to a representation of the signal quality on the first radio link.

EXAMPLE 7

The wireless node of Example 1, wherein the radio link information is carried via a signal of Adaptation layer.

EXAMPLE 8

The wireless node of Example 1, wherein the radio link information is carried via a signal of Radio Link Control (RLC) layer.

EXAMPLE 9

The wireless node of Example 1, wherein the radio link information is carried via a signal of Medium Access Control (MAC) layer.

EXAMPLE 10

The wireless node of Example 1, wherein the radio link information is carried via a physical layer signal.

EXAMPLE 11

The wireless node of Example 1, wherein the transmitter circuitry is configured to transmit, for the second interface, to the wireless terminals a value of a timer associated with the radio link information.

EXAMPLE 12

A wireless terminal equipped with at least one radio interface configured to establish a radio link with at least one wireless node, the wireless terminal comprising:
receiver circuitry configured to receive, for the radio interface, downlink (DL) user data and/or DL signaling data;
transmitter circuitry configured to transmit, for the radio interface, uplink (UL) user data and/or UL signaling data;
processor circuitry configured to:
perform a designated action based on a reception of radio link information;

wherein the radio link information represents the radio condition on a first radio link, and the first radio link corresponds to a radio link between the wireless node and a parent node.

EXAMPLE 13

The wireless terminal of Example 12, wherein the wireless terminal is a User Equipment (UE).

EXAMPLE 14

The wireless terminal of Example 12, wherein the wireless terminal is a wireless node.

EXAMPLE 15

The wireless terminal of Example 12, wherein the parent node is a donor node connected with a core network.

EXAMPLE 16

The wireless terminal of Example 12, wherein the parent node is a wireless node.

EXAMPLE 17

The wireless terminal of Example 12, wherein the radio link information corresponds to a radio link failure on the first radio link.

EXAMPLE 18

The wireless terminal of Example 12, wherein the radio link information corresponds to a recovery from a radio link failure on the first radio link on the first radio link.

EXAMPLE 19

The wireless terminal of Example 12, wherein the radio link information corresponds to a representation of the signal quality on the first radio link.

EXAMPLE 20

The wireless terminal of Example 12, wherein the radio link information is carried via a signal of Adaptation layer.

EXAMPLE 21

The wireless terminal of Example 12, wherein the radio link information is carried via a signal of Radio Link Control (RLC) layer.

EXAMPLE 22

The wireless terminal of Example 12, wherein the radio link information is carried via a signal of Medium Access Control (MAC) layer.

EXAMPLE 23

The wireless terminal of Example 12, wherein the radio link information is carried via a physical layer signal.

EXAMPLE 24

The wireless terminal of Example 12, wherein the designated action comprises a cell selection.

EXAMPLE 25

The wireless terminal of Example 12, wherein the wireless terminal starts a timer based on receipt of the radio link information and perform the designated action when the timer expires.

EXAMPLE 26

The wireless terminal of Example 25, wherein the wireless terminal stops the timer based on receipt of the radio link information corresponding to the recovery in a case where the timer is running.

EXAMPLE 27

The wireless terminal of Example 25, wherein a value of the timer is pre-configured.

EXAMPLE 28

The wireless terminal of Example 25, wherein a value of the timer is configured by the wireless node.

EXAMPLE 29

The wireless terminal of Example 28, wherein the value of the timer is commonly or independently configured for each designated action.

EXAMPLE 30

A method for a wireless node equipped with at least two radio interfaces comprising a first interface and a second interface, the first interface being configured to establish a first radio link with at least one parent node, the second interface being configured to establish a second radio link(s) with one or more wireless terminals, the method comprising:
- receiving, for the first interface, downlink (DL) user data and/or DL signaling data;
- transmitting, for the first interface, uplink (UL) user data and/or UL signaling data;
- receiving, for the second interface, UL user data and/or UL signaling data;
- transmitting, for the second interface, DL user data and/or DL signaling data;
- relaying the DL user data and/or DL signaling data from the first interface to the second interface;
- relaying the UL user data and/or UL signaling data from the second interface to the first interface;
- monitoring a radio condition on the first radio link for the first interface;
- wherein radio link information representing the radio condition on the first radio link is transmitted on the second radio link for the second interface.

EXAMPLE 31

The method of Example 30, wherein the parent node is a donor node connected with a core network.

EXAMPLE 32

The method of Example 30, wherein the parent node is another wireless node.

EXAMPLE 33

The method of Example 30, wherein the radio link information corresponds to a radio link failure on the first radio link.

EXAMPLE 34

The method of Example 30, wherein the radio link information corresponds to a recovery from a radio link failure on the first radio link.

EXAMPLE 35

The method of Example 30, wherein the radio link information corresponds to a representation of the signal quality on the first radio link.

EXAMPLE 36

The method of Example 30, wherein the radio link information is carried via a signal of Adaptation layer.

EXAMPLE 37

The method of Example 30, wherein the radio link information is carried via a signal of Radio Link Control (RLC) layer.

EXAMPLE 38

The method of Example 30, wherein the radio link information is carried via a signal of Medium Access Control (MAC) layer.

EXAMPLE 39

The method of Example 30, wherein the radio link information is carried via a physical layer signal.

EXAMPLE 40

The method of Example 30, wherein further comprising transmitting, for the second interface, to the wireless terminals a value of a timer associated with the radio link information.

EXAMPLE 41

A method for a wireless terminal equipped with at least one radio interface configured to establish a radio link with at least one wireless node, the method comprising:
receiving, for the radio interface, downlink (DL) user data and/or DL signaling data;
transmitting, for the radio interface, uplink (UL) user data and/or UL signaling data;
processor circuitry configured to:
perform a designated action based on a reception of radio link information;
wherein the radio link information represents the radio condition on a first radio link, and the first radio link corresponds to a radio link between the wireless node and a parent node.

EXAMPLE 42

The method of Example 41, wherein the wireless terminal is a User Equipment (UE).

EXAMPLE 43

The method of Example 41, wherein the wireless terminal is a wireless node.

EXAMPLE 44

The method of Example 41, wherein the parent node is a donor node connected with a core network.

EXAMPLE 45

The method of Example 41, wherein the parent node is a wireless node.

EXAMPLE 46

The method of Example 41, wherein the radio link information corresponds to a radio link failure on the first radio link.

EXAMPLE 47

The method of Example 41, wherein the radio link information corresponds to a recovery from a radio link failure on the first radio link on the first radio link.

EXAMPLE 48

The method of Example 41, wherein the radio link information corresponds to a representation of the signal quality on the first radio link.

EXAMPLE 49

The method of Example 41, wherein the radio link information is carried via a signal of Adaptation layer.

EXAMPLE 50

The method of Example, wherein the radio link information is carried via a signal of Radio Link Control (RLC) layer.

EXAMPLE 51

The method of Example 41, wherein the radio link information is carried via a signal of Medium Access Control (MAC) layer.

EXAMPLE 52

The method of Example 41, wherein the radio link information is carried via a physical layer signal.

EXAMPLE 53

The method of Example 41, wherein the designated action comprises a cell selection.

EXAMPLE 54

The method of Example 41, wherein further comprising starting a timer based on receipt of the radio link information and perform the designated action when the timer expires.

EXAMPLE 55

The method of Example 54, wherein further comprising stopping the timer based on receipt of the radio link information corresponding to the recovery in a case where the timer is running.

EXAMPLE 56

The method of Example 54, wherein a value of the timer is pre-configured.

EXAMPLE 57

The method of Example 54, wherein a value of the timer is configured by the wireless node.

EXAMPLE 58

The method of Example 54, wherein a value of the timer is configured by the network administrator.

EXAMPLE 59

The method of Example 58, wherein the value of the timer is commonly or independently configured for each designated action.

EXAMPLE 60

A method of Handling Radio Link Failures (RLF) in a Wireless Relay Network, the wireless relay network having a donor node, a first parent node, a second parent node, a first child node, and a second child node, wherein the donor node is an Integrated Access and Backhaul (IAB) node connected to a core network, and wherein the first parent node, the second parent node, the first child node, and the second child node each have Mobile Termination (MT) functionality capabilities, the method comprising:
- transmitting, by a first child node (IAB-node A), a message comprising an Upstream RLF notification to a second child node (UE/IAB Child node) based on an upstream radio link failure between the first child node and a first parent node (IAB Parent node 1), wherein the first child node is in connected mode with the second child node;
- receiving, by the second child node in communication with the first child node, the message comprising the Upstream RLF notification, wherein the second child node is at least one of: a User Equipment (UE) and an Integrated Access and Backhaul (IAB) node;
- initiating, by the second child node, a cell selection procedure with a second parent node (IAB Parent node 2) before the expiration of a timer (Txxx) set for a period of time and based on the received Upstream RLF notification message from the first child node, wherein the initiating of the cell selection uses the MT functionality;
- listening, by the second child node, for incoming message from the first child node during a timer (Tyyy) set for another period of time before the initiating step; and
- performing, by the second child node, a reestablishment procedure with the first child node if an Upstream Recovery notification is received from the first parent node before the expiration of the timer (Tyyy).

EXAMPLE 61

The method of Example 60, wherein the upstream radio link failure is based on signal strength of at least one of: Reference Signal Received Power (RSRP)/Reference Signal Received Quality (RSRQ) levels associated with the connection.

EXAMPLE 62

The method of Example 60, further comprising: transmitting, by the second child node to the first child node, an acknowledgement message based on the received Upstream RLF notification message.

EXAMPLE 63

The method of Example 60, further comprising: distinguishing, by the donor node, whether the second node is an IAB-node or a User Equipment.

EXAMPLE 64

The method of Example 60, wherein the first parent node is in communication with a donor node.

EXAMPLE 65

The method of Example 60, wherein the first parent node, the second parent node, the first child node, and the second child node each comprise a Distributed Unit component and a Mobile Termination component.

EXAMPLE 66

The method of Example 60, wherein the Upstream RLF notification is carried by at least one of: an Adaptation Layer, a Radio Link Control (RLC) sublayer, a Medium Access Control (MAC) sublayer, and a physical layer signaling.

EXAMPLE 67

The method of Example 60, wherein the first child node (IAB-node A) and the second child node (UE/IAB Child node) maintain a radio link with each other while the message comprising an Upstream RLF notification is received and processed.

EXAMPLE 68

An integrated access and backhaul (IAB) node equipped with at least two radio interfaces comprising a first interface and a second interface, the first interface being configured to establish a first radio link with at least one parent node, the second interface being configured to establish a second radio link(s) with one or more wireless terminals, the IAB node comprising: processor circuitry configured to: detect a radio link failure (RLF) on the first radio link for the first interface, and; perform a re-establishment procedure on the first radio link for the first interface to re-establish a radio resource control (RRC) connection with at least one parent node; transmitter circuitry configured to transmit, on the second radio link for the second interface, an RLF notification to the one or more wireless terminals; wherein; the RLF notification indicates that the re-establishment procedure has failed.

EXAMPLE 69

The IAB node of Example 68, wherein the re-establishment procedure fails in a case that a suitable cell is not found within certain time after the RLF is declared.

EXAMPLE 70

The IAB node of Example 68, wherein the RLF notification is carried via a signal of Backhaul Adaptation Protocol (BAP).

EXAMPLE 71

The IAB node of Example 68, wherein the RLF notification is carried via a signal of Medium Access Control (MAC) layer.

EXAMPLE 72

A wireless terminal that communicates with an integrated access and backhaul (IAB) node over a radio interface, the wireless terminal comprising: receiver circuitry configured to receive, from the IAB node, a radio link failure (RLF) notification; processor circuitry configured to perform a cell selection procedure based on a reception of the RLF notification, wherein; the RLF notification indicates that the IAB node has failed in a re-establishment procedure to re-establish a radio resource control (RRC) connection to any parent node(s).

EXAMPLE 73

The wireless terminal of Example 72, wherein the re-establishment procedure fails in a case that the IAB node does not find a suitable cell within certain time after the IAB node detects an RLF on a radio link to a parent node.

EXAMPLE 74

The wireless terminal of Example 72, wherein the wireless terminal is a User Equipment (UE).

EXAMPLE 75

The wireless terminal of Example 72, wherein the wireless terminal is an IAB node.

EXAMPLE 76

The wireless terminal of Example 72, wherein the RLF notification is carried via a signal of Backhaul Adaptation Protocol (BAP).

EXAMPLE 77

The wireless terminal of Example 72, wherein the RLF notification is carried via a signal of Medium Access Control (MAC) layer.

EXAMPLE 78

A method for an integrated access and backhaul (IAB) node equipped with at least two radio interfaces comprising a first interface and a second interface, the first interface being configured to establish a first radio link with at least one parent node, the second interface being configured to establish a second radio link(s) with one or more wireless terminals, the method comprising: detecting a radio link failure (RLF) on the first radio link for the first interface; performing a re-establishment procedure on the first radio link for the first interface to re-establish a radio resource control (RRC) connection with at least one parent node; transmitting, on the second radio link for the second interface, an RLF notification to the one or more wireless terminals; wherein; the RLF notification indicates that the re-establishment procedure has failed.

EXAMPLE 79

The method of Example 78, wherein the re-establishment procedure fails in a case that a suitable cell is not found within certain time after the RLF is declared.

EXAMPLE 80

The method of Example 78, wherein the RLF notification is carried via a signal of Backhaul Adaptation Protocol (BAP).

EXAMPLE 81

The method of Example 78, wherein the RLF notification is carried via a signal of Medium Access Control (MAC) layer.

EXAMPLE 82

A method for a wireless terminal that communicates with an integrated access and backhaul (IAB) node over a radio interface, the method comprising: receiving, from the IAB node, a radio link failure (RLF) notification; performing a cell selection procedure based on a reception of the RLF notification, wherein; the RLF notification indicates that the IAB node has failed in a re-establishment procedure to re-establish a radio resource control (RRC) connection to any parent node(s).

EXAMPLE 83

The method of Example 82, wherein the re-establishment procedure fails in a case that the IAB node does not find a suitable cell within certain time after the IAB node detects an RLF on a radio link to a parent node.

EXAMPLE 84

The method of Example 82, wherein the wireless terminal is a User Equipment (UE).

EXAMPLE 85

The method of Example 82, wherein the wireless terminal is an IAB node.

EXAMPLE 86

The method of Example 82, wherein the RLF notification is carried via a signal of Backhaul Adaptation Protocol (BAP).

EXAMPLE 87

The method of Example 82, wherein the RLF notification is carried via a signal of Medium Access Control (MAC) layer.

What is claimed is:

1. An integrated access and backhaul (IAB) node equipped with at least two radio interfaces comprising a first interface and a second interface, the first interface being configured to establish a first radio link with at least one parent node, the second interface being configured to establish a second radio link with one or more wireless terminals, the IAB node comprising:
    processor circuitry configured to:
        detect a radio link failure (RLF) on the first radio link for the first interface, and
        perform a re-establishment procedure on the first radio link for the first interface to re-establish a radio resource control (RRC) connection with the at least one parent node; and
    transmitter circuitry configured to transmit, on the second radio link for the second interface, an RLF notification to the one or more wireless terminals in response to a failure of the re-establishment procedure on the first radio link,
    wherein:
    the re-establishment procedure fails in a case that a suitable cell is not found within a certain time period after the RLF is detected,
    the RLF notification indicates that the re-establishment procedure has failed, and
    the RLF notification is transmitted via a signal of a Backhaul Adaptation Protocol (BAP).

2. A wireless terminal that communicates with an integrated access and backhaul (IAB) node over a radio interface, the wireless terminal comprising:
    receiver circuitry configured to receive, from the IAB node, a radio link failure (RLF) notification in response to a failure of a re-establishment procedure performed by the IAB node on a first radio link between the IAB node and a parent node; and
    processor circuitry configured to perform a cell selection procedure based on the reception of the RLF notification;
    wherein:
    the re-establishment procedure fails in a case that the IAB node does not find a suitable cell within a certain time period after the IAB node detects an RLF on the first radio link,
    the RLF notification indicates that the IAB node has failed in the re-establishment procedure on the first radio link to re-establish a radio resource control (RRC) connection to any parent node,
    the RLF notification is received on a second radio link between the IAB node and the wireless terminal, and
    the RLF notification is received via a signal of a Backhaul Adaptation Protocol (BAP).

3. The wireless terminal of claim 2, wherein the wireless terminal is a User Equipment (UE).

4. The wireless terminal of claim 2, wherein the wireless terminal is another IAB node.

5. A method for an integrated access and backhaul (IAB) node equipped with at least two radio interfaces comprising a first interface and a second interface, the first interface being configured to establish a first radio link with at least one parent node, the second interface being configured to establish a second radio link with one or more wireless terminals, the method comprising:
    detecting a radio link failure (RLF) on the first radio link for the first interface;
    performing a re-establishment procedure on the first radio link for the first interface to re-establish a radio resource control (RRC) connection with the at least one parent node; and
    transmitting, on the second radio link for the second interface, an RLF notification to the one or more wireless terminals in response to a failure of the re-establishment procedure on the first radio link,
    wherein:
    the re-establishment procedure fails in a case that a suitable cell is not found within certain time period after the RLF is detected,
    the RLF notification indicates that the re-establishment procedure has failed, and
    the RLF notification is transmitted via a signal of a Backhaul Adaptation Protocol (BAP).

6. A method for a wireless terminal that communicates with an integrated access and backhaul (IAB) node over a radio interface, the method comprising:
    receiving, from the IAB node, a radio link failure (RLF) notification in response to a failure of a re-establishment procedure performed by the IAB node on a first radio link between the IAB node and a parent node; and
    performing a cell selection procedure based on the reception of the RLF notification;
    wherein:
    the re-establishment procedure fails in a case that the IAB node does not find a suitable cell within certain time period after the IAB node detects an RLF on the first radio link,
    the RLF notification indicates that the IAB node has failed in the re-establishment procedure on the first radio link to re-establish a radio resource control (RRC) connection to any parent node,
    the RLF notification is received on a second radio link between the IAB node and the wireless terminal, and
    the RLF notification is received via a signal of a Backhaul Adaptation Protocol (BAP).

7. The method of claim 6, wherein the wireless terminal is a User Equipment (UE).

8. The method of claim 6, wherein the wireless terminal is another IAB node.

* * * * *